United States Patent [19]

Whitney et al.

[11] 4,156,835

[45] May 29, 1979

[54] SERVO-CONTROLLED MOBILITY DEVICE

[75] Inventors: Daniel E. Whitney, Arlington; James L. Nevins, Jr., Burlington, both of Mass.

[73] Assignee: Massachusetts Institute of Technology, Cambridge, Mass.

[21] Appl. No.: 474,342

[22] Filed: May 29, 1974

[51] Int. Cl.² .............................................. G05B 13/00
[52] U.S. Cl. .................................... 318/561; 318/646; 318/648; 364/105
[58] Field of Search ............... 318/561, 646, 648, 628; 235/150.1, 150.2, 150.25, 150.11 M; 364/105

[56] References Cited

U.S. PATENT DOCUMENTS

| | | | |
|---|---|---|---|
| 3,543,910 | 12/1970 | Devol | 318/151.11 |
| 3,548,172 | 12/1970 | Centner et al. | 318/561 |
| 3,622,767 | 11/1971 | Koepcke | 318/561 |
| 3,849,712 | 11/1974 | Lankford et al. | 318/561 |

OTHER PUBLICATIONS

"The Robot Revolution", Machinery, Aug. 68, vol. 79, No. 12, pp. 63–67.
"Resolved Motion Rate Control of Manipulators and Human Prostheses", Whitney, Daniel E., IEEE Transactions on Man–Machine Systems, vol. MMS-10, No. 2, Jun. 1969.
Whitney, D. E., "The Mathematics of Coordinated Control of Prosthetic Arms and Manipulators", Transactions of the ASME, Paper No. 72-WA/Aut-4, 1972.
Beckett et al., "Controlling a Remote Manipulator with Aid of a Small Computer", ASME Paper No. 70-DE-18, 1970.

*Primary Examiner*—Gene Z. Rubinson
*Assistant Examiner*—Eugene S. Indyk
*Attorney, Agent, or Firm*—Kenway & Jenney

[57] ABSTRACT

A servo system includes a servo loop incorporating an articulated mechanical arm or other controllable element, resolved motion rate control apparatus or other coordinate transformation apparatus, and an accommodation branch. The transfer characteristics may be readily adjusted to constrain the controllable element to accomplish a desired task, and the accommodation branch transfer characteristics may be readily modified to accomplish the performance of many different tasks without modifications to other portions of the system.

12 Claims, 5 Drawing Figures

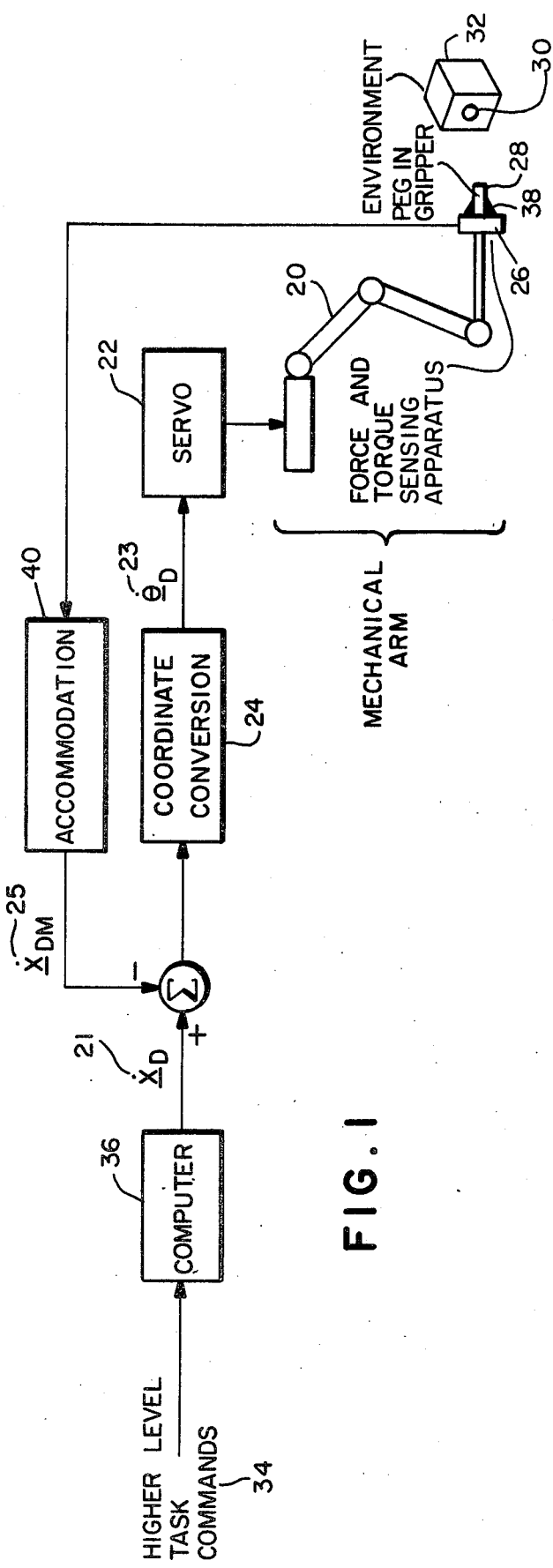
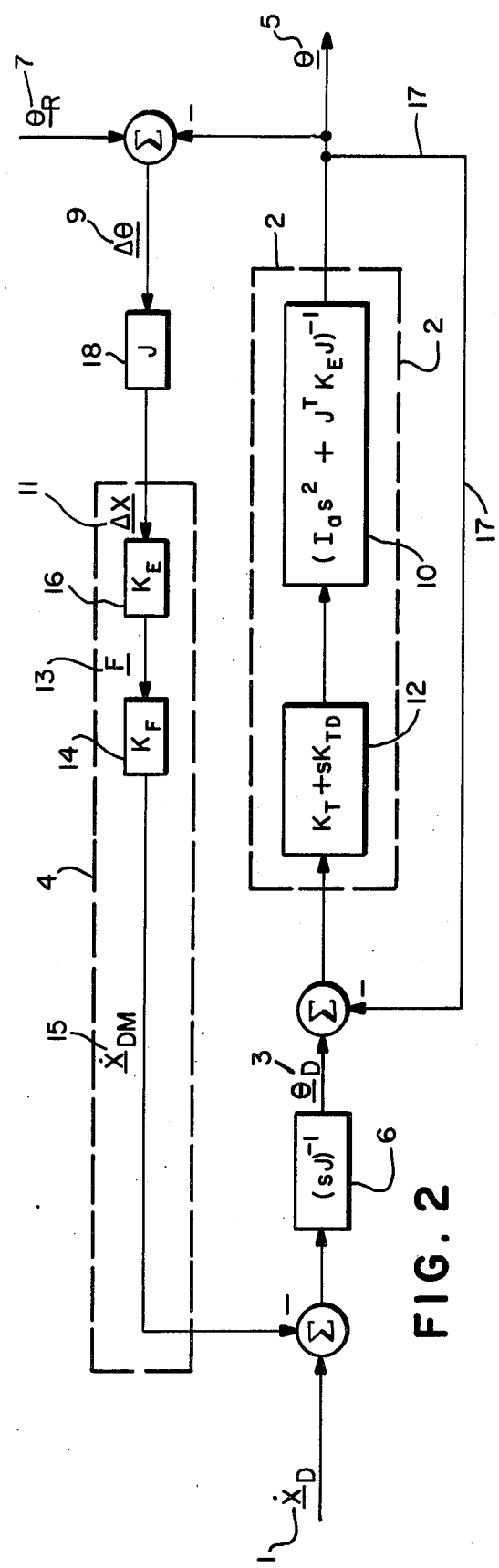
FIG. 1
FIG. 2

SERVO-CONTROLLED MOBILITY DEVICE

PRIOR ART

Subsequent to World War II there have been extensive efforts to control automatically functions which previously required the continuous intervention or control of a human operator. Numerical Control Servo System, Forrester et al., U.S. Pat. No. 3,069,608, directed to digitally controlled apparatus, is an example of a sophisticated version of such techniques. However, techniques such as the Forrester digitally controlled milling machine resulted in so-called open-loop apparatus, that is, the apparatus traveled along a specified path, but interaction between the apparatus and its environment or objects along its path played no part in determining the course of the tool. Fundamentally similar industrial systems are now on the market in the form of American Machine Foundry's "Versatran" and Unimation Inc.'s "Unimate". These machines are all basically open-loop machines under the control of pre-programmed instructions with minimal, if any, feedback. They may, for example, employ some feedback to stop further motion when the head comes into position to make, for example, a desired weld.

Certain researchers began to realize that a more sophisticated system was necessary if every application was not to involve very specific, specialized predesigned programming. At Massachusetts Institute of Technology's Draper Laboratory extensive work was done upon systems involving force and torque feedbacks to "steer" a mechanical arm or hand to provide desired functions. For example the Master of Science thesis of Roland C. Groome Jr., (Massachusetts Institute of Technology, 1972, also available as MIT C. S. Draper Laboratory report T-575) based upon work done under Mr. James L. Nevins at the Draper Laboratory, describes in considerable detail a system involving force steering loops to control an Argonne National Laboratories Model E-2 manipulator, a device having six different degrees of freedom. The apparatus is capable of functions such as inserting a half-inch diameter peg into a hole with a clearance between the peg and the hole of only approximately five thousandths of an inch. It became apparent, however, that even apparatus such as Groome's involved considerable design that was specific to a given task.

THE PRESENT INVENTION

Accordingly it is an object of the present invention to achieve motion control apparatus which is adapted to the performance of many different tasks through easily performable modifications to a single portion of the control apparatus.

A further object is to achieve motion control apparatus wherein changes in the environment or modifications to the sensing apparatus may be readily incorporated without modifying other parts of the system. A further object is to provide a motion control system which may be easily applied to mechanical arms or other controllable motion apparatus through easily accomplished system adjustments. A further object is to achieve motion control apparatus in which each part of the system may be dealt with in its own natural or most convenient coordinates, including the coordinates of the environment, so as to facilitate achievement of the above objectives.

These and other objects of the invention are achieved in a servo system which includes a servo loop incorporating the controllable element, resolved motion rate control apparatus or other coordinate transformation apparatus as appropriate, and an accommodation branch, all of whose transfer characteristics may be readily adjusted to constrain the controllable element to accomplish a desired task.

DRAWINGS

FIG. 1 is a schematic representation of a system embodiment incorporating a mechanical arm.

FIG. 2 is a mathematical model of a system embodiment incorporating a mechanical arm.

DETAILED DESCRIPTION OF THE INVENTION

Figure 3:
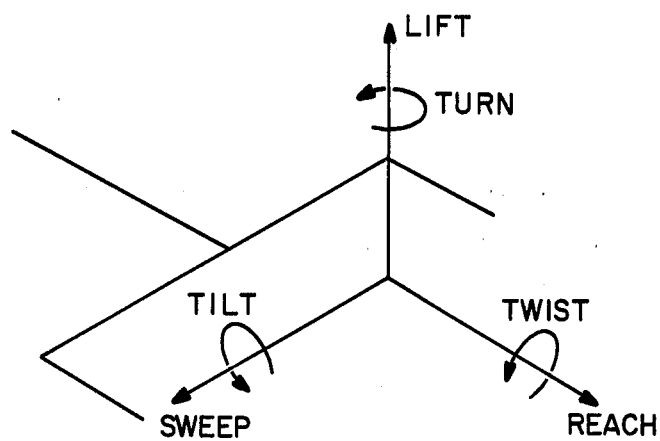
FIG. 3 is a schematic representation of coordinates for a gripper for use in the system of FIGS. 1 or 2.

FIG. 1 shows schematically the physical elements of an example system constructed according to the above objectives, carrying out an example task. It consists of a controllable motion device 20, namely an Argonne arm, a servo 22 to drive that arm, coordinate conversion apparatus 24, force and torque sensing apparatus 26 at or near the end of the arm, (such sensing apparatus could be located in the environment, or sensory apparatus could be located both on the controlled element and in the environment), a peg 28 grasped by the arm, and a hole 30 in a block located in the environment 32. Higher level task commands 34 indicate to the computer 36 that the peg 28 is to be put in the hole 30. Commands $\dot{x}_D(21)$ represent velocity commands expressed in the coordinate system of the arm's gripper 38, and are designed to drive the peg to the mouth of the hole 30. The coordinate conversion apparatus 24 converts these commands into $\dot{\theta}_D(23)$, the desired commands expressed in the coordinates of the degrees of freedom of the arm. When the tip of the peg hits the mouth of the hole, forces and torques are exerted on the peg. These forces and torques are sensed by the sensing apparatus and expressed in the coordinates of the gripper. The sensing apparatus signals are sent to the accommodation branch 40 which, according to task related logic, generates velocity modification commands $\dot{X}_{DM}(25)$ in gripper coordinates. The net velocity commands are then converted, as before, into motion commands in the controllable degrees of freedom of the arm. In some systems constructed according to these principles, the computer 36 may perform the accommodation, force sensor processing, coordinate conversion and/or servo functions, but this is not necessary.

FIG. 2 shows a mathematical model of a servo controlled motion device in elastic contact with a generalized environment. This model is useful for designing such systems and understanding their behavior. That portion of the system within the dotted box 2 represents the controllable motion device with its control and transfer function terms representing the controllable element, the environment and the sensing device. That portion within the dotted box 4 represents the accommodation branch which includes transfer functions which will constrain the system's operation to achieve the desired task, along with functions which mathematically represent the environment and the sensing device characteristics. Box 6 represents a resolved motion rate conroller which serves to produce signals appropriate to the desired task motion when its output is applied to a controllable motion device of an articulated nature, or other complex motion device. If the motion device is particularly simple, the coordinate conversions accomplished by box 6 may not be necessary.

The various portions of the servo system of FIG. 2 will now be discussed in greater detail. Box 10 contains a typical transfer function which mathematically represents the controllable element - for example, a mechanical arm such as the Argonne arm - interacting elastically with its environment. (Other types of interaction impedance could be utilized, but this interaction is used as in example.) $I_a$ represents the inertia matrix of the controllable element while $K_E$ represents the stiffness matrix of the force sensors and the environment. If, for example, an Argonne arm is used as a controllable element, matrix $I_a$ may be calculated as set forth in Kahn, M. E., "The Near Minimum-Time Control of Open Loop Articulated Kinematic Chains," Ph.D Thesis, Stanford University, 1970. (Available from Xerox University Microfilms, Ann Arbor, Michigan, order No. 70-18425.) $I_a$ is expressed in the coordinates of the controllable degrees of freedom of the arm. Matrix $K_E$ is calculated as set forth in Appendix 1, and is expressed in this example in the coordinates of the gripper to which the sensor is attached. The remaining terms in box 10 are the Laplace operator s, the matrix J representing the resolved motion rate control function and superscript T representing matrix transpose. Matrix J may be calculated as set forth in Whitney, D. E., "The Mathematics of Coordinated Control of Prosthetic Arms and Manipulators", *ASME Journal of Dynamic Systems, Measurement and Control*, December, 1972, pp 303-309.

Box 6 performs the resolved motion rate control function and acts to convert a vector of motion commands $\dot{x}_D(1)$ or $\dot{x}_{DM}(15)$ (expressed in task-related coordinates) into commands to the controllable degrees of freedom of the motion device (for example an Argonne arm) so that the desired motions of the controllable motion device will occur. (In FIG. 2 these motions are expressed in the coordinates of the controllable degrees of freedom of the motion device $(\theta)(5)$ for mathematical convenience.) FIG. 3 shows schematically a typical gripper for an arm such as the Argonne arm with a typical set of coordinates attached to it.

Block 12 contains a typical servo for an arm such as the Argonne arm. This helps determine the response of the controllable element servo loop. Matrices $K_T$ and $K_{TD}$ are chosen to provide the type of characteristics which the servo loop will exhibit. For example, one may adjust or tune the servo to control the sensitivity and rate at which a particular task is accomplished. The coefficients are calculated as set forth in Nevins, J. L., Whitney, D. E., and Simunovic, S. N., "System Architecture for Assembly Machines", C. S. Draper Laboratory Inc. Report No. R-764, pp. 39-53. In some arm mechanizations, the actuators may be sufficiently responsive so that the servo loop closed around box 2 and the servo apparatus in box 12 are not needed, or are substantially simplified. In other cases, more complex servo apparatus may be needed in box 12, and should be designed according to the art of servo control design.

Considering now the accommodation branch in dotted box 4, the task logic which determines the way the controllable element will be constrained to perform a task is determined by the transfer function in box 14. If the controllable motion device is an Argonne arm, F(13) is a vector of forces and torques applied to the gripper by the environment. Matrix $K_F$ is an admittance matrix which receives input F (13) and converts it into velocity modifications vector $\dot{x}_{DM}$ (15), both expressed in gripper coordinates. Force and torque vector F arises from deformations $\Delta x$ (11) which occur in the environment and in the force sensor as a result of contact between the controllable element and the environment. $\Delta x$ is also expressed in gripper coordinates. For mathematical convenience, this deformation is shown in FIG. 2 as $\Delta \theta$ (9), its equivalent in the coordinates of the controllable degrees of freedom of the controllable element. Matrix J in box 18 is the same as the matrix which is used in box 6. Box 18 is part of the mathematical model only and has no counterpart in a physical system. The coordinates of the environment are also shown for mathematical convenience in the coordinates of the controllable element as vector $\theta_R(7)$. The sign conventions in this branch are such that, if $K_F$ is taken to be the identity matrix, then if a force vector F (13) is applied to the gripper, the vector $\dot{x}_{DM}(15)$ will be exactly parallel to and proportional to vector F. Matrix $K_E$ (Box 16) is the same as the matrix $K_E$ which appears in box 10. It mathematically models the force-deformation characteristics of the sensor and the environment.

The calculation of matrix $K_F$ is considerably eased by the fact that its input and output are both in gripper coordinates. $K_F$ may be calculated as set forth for example in Nevins, J. L., and Whitney, D. E., "The Force Vector Assembler Concept," MIT C. S. Draper Lab. Report No. E-2754, the admittance matrix shown therein serving as $K_F$ for a system designed to put a peg in a hole as shown at page 13 of Nevins and Whitney. As set forth in this report, it is assumed that the gripper coordinates are velocities as follows:

$$\dot{x} = \frac{d}{dt} \begin{bmatrix} \text{Reach} \\ \text{Sweep} \\ \text{Lift} \\ \text{Twist} \\ \text{Tilt} \\ \text{Turn} \end{bmatrix}$$

and that the desired task is to put a peg in a hole starting from a point where the peg is in the mouth of the hole but is misaligned. The task logic is to use the forces and torques created by a command in the reach direction to create velocity modifications which will tend to correct the misalignment. Therefore, set $$\dot{x}_D = \begin{bmatrix} \text{Reach} \\ 0 \\ 0 \\ 0 \\ 0 \\ 0 \end{bmatrix}$$

and let $K_F$ be the matrix $$\begin{bmatrix} -1 & 0 & 0 & 0 & 0 & 0 \\ 0 & -100 & 0 & 0 & 0 & 0 \\ 0 & 0 & -100 & 0 & 0 & 0 \\ 0 & 0 & 0 & -100 & 0 & 0 \\ 0 & 0 & 0 & 0 & -100 & 0 \\ 0 & 0 & 0 & 0 & 0 & -100 \end{bmatrix}$$

This matrix will cause motions other than reach to occur in accommodation to the cross forces and torques caused by misalignment. However, the 1 in the upper left corner of the matrix (in Report E-2754, the sign of this 1 is incorrect) will cause little modification to the reach motion unless forces sensed in the reach direction become extremely high, such as when the peg bottoms in the hole, at which point motion will stop. Except for the zeroes, the quantities in the matrices set forth in the specification are representative and may be adjusted along with command vector $\dot{x}_D$ to modify the precise characteristics of system performance, including the overall servo dynamics, the force levels at which motion will commence or cease, and so on. The sign conventions may also be adjusted at will, so long as the accommodation branch and the remainder of the apparatus remain a stable dynamic system.

In some mechanizations of such systems, it will be convenient or appropriate to observe the motions of the arm via sensors on the arm or in the environment, and compose torque or force commands to the arm's actuators according to similar task related logic. This will be useful in such tasks as stretching springs or cables to a specified degree of deformation. In other mechanizations, it will be useful or convenient to sense the forces and torques applied to the arm by the environment and compose force or torque commands to the arm via an accommodation branch according to task related logic. This will be useful in such tasks as applying desired force or torque patterns. In each case if the driving components or arm have a response sufficiently precisely related to the command inputs it may be unnecessary to have the feedback connection 17 shown in FIG. 2, in which case servo 12 may be substantially simplified or altered.

Figure 5:
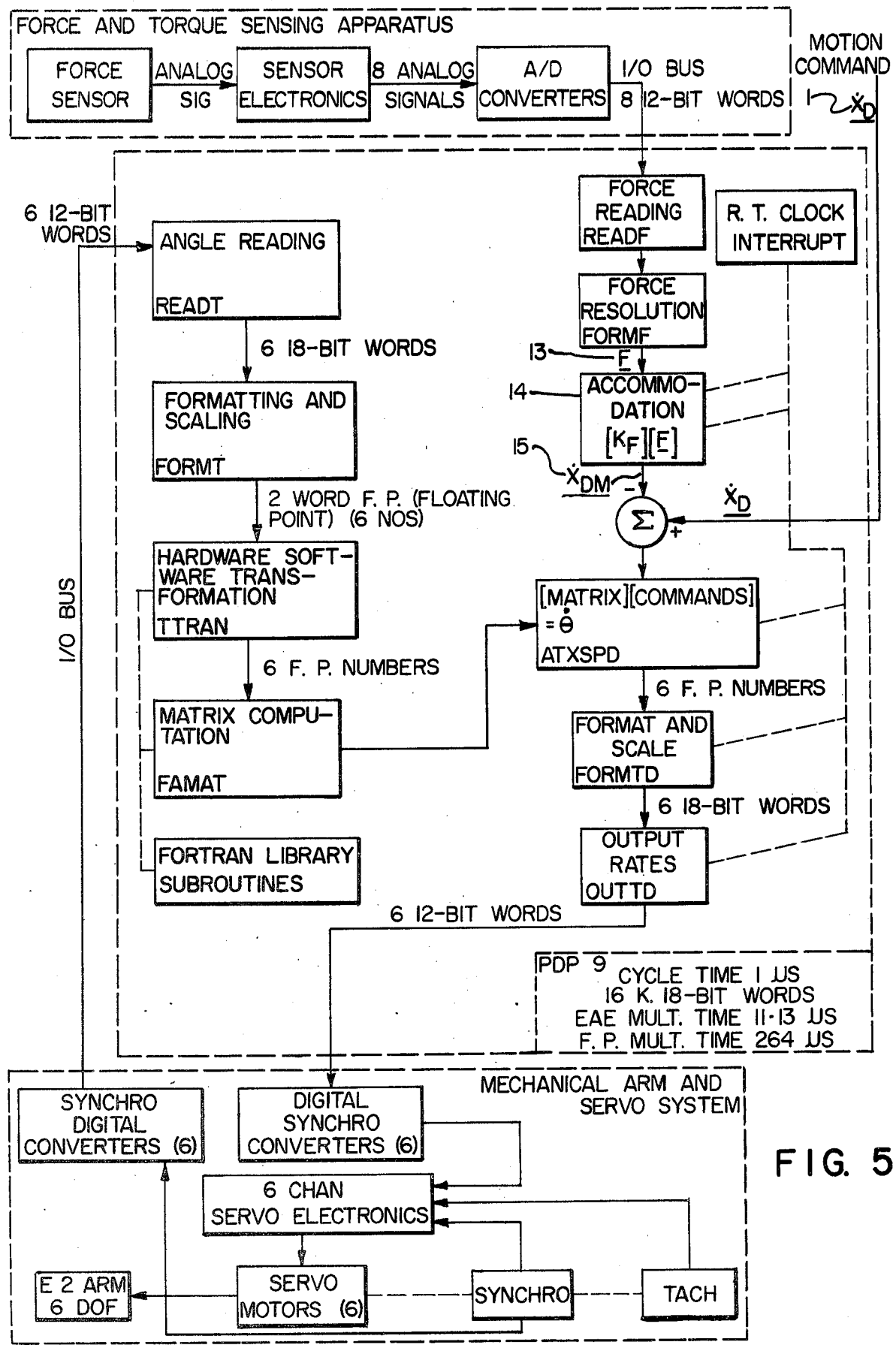
FIG. 5 is a schematic representation of an embodiment of the systems of FIGS. 1 and 2.

FIG. 5 shows in block diagram form a detailed embodiment of the system of FIG. 1, which also corresponds to the mathematical model shown in FIG. 2. The computer subroutines indicated in FIG. 5 are shown in Appendix II.

APPENDIX 1 — Calculation of $K_E$

Matrix $K_E$ represents the stiffness of the force sensing apparatus and the environment, and is defined mathematically by the relation $$K_E = [C_S + C_{EN}]^{-1}$$

where $C_S$ represents the compliance of the sensor and $C_{EN}$ represents the compliance of the environment. We shall pursue here the case where the environment is, relative to the sensor, infinitely stiff, so that $C_{EN} = 0$. Then $K_E = K_S = C_S^{-1}$.

Figure 4:
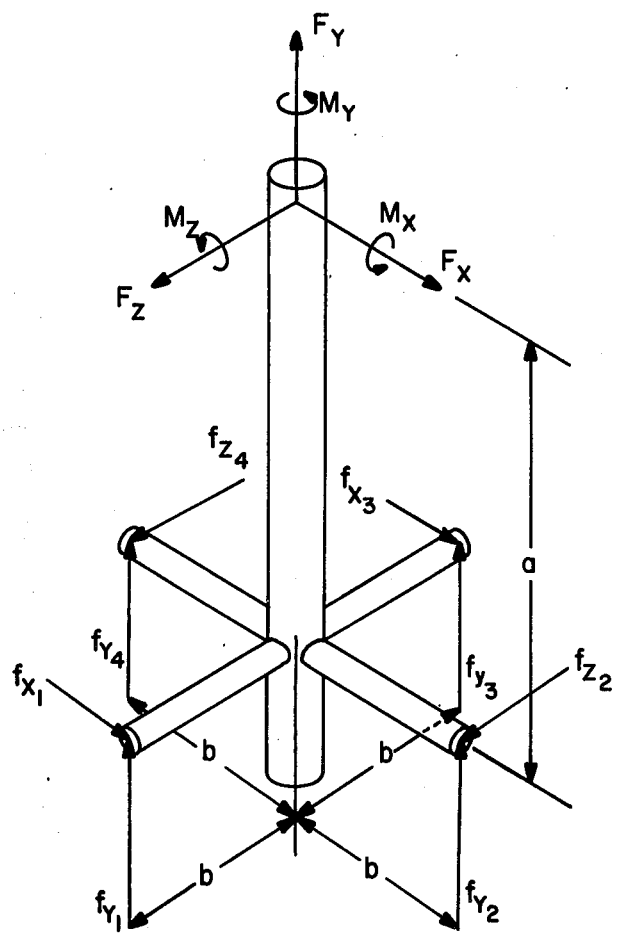
FIG. 4 is a schematic representation of force components for a force sensor for use in the systems of FIGS. 1 or 2.

The stiffness matrix $K_S$ of the force sensor shown schematically in FIG. 4 and discussed in Groome has, by design, the form $$K_s = C_s^{-1} = \begin{bmatrix} K_{xx} & 0 & 0 & 0 & 0 & 0 \\ 0 & K_{yy} & 0 & 0 & 0 & 0 \\ 0 & 0 & K_{zz} & 0 & 0 & 0 \\ 0 & 0 & 0 & K_{\theta x} & 0 & 0 \\ 0 & 0 & 0 & 0 & K_{\theta y} & 0 \\ 0 & 0 & 0 & 0 & 0 & K_{\theta z} \end{bmatrix}$$

This is a diagonal matrix. The meaning of each entry is:

$K_{xx} = \dfrac{F_x}{\delta_x}$ [units of force/displacement]

$K_{yy} = \dfrac{F_y}{\delta_y}$ [units of force/displacement]

$K_{zz} = \dfrac{F_z}{\delta_z}$ [units of force/displacement]

$K_{\theta x} = \dfrac{M_x}{\theta_x}$ [units of moment/angular displacement in radians]

$K_{\theta y} = \dfrac{M_y}{\theta_y}$ [units of moment/angular displacement in radians]

$K_{\theta z} = \dfrac{M_z}{\theta_z}$ [units of moment/angular displacement in radians]

$F_x$, $F_y$, $M_x$, $M_y$, $M_z$ are defined in FIG. 4 and comprise the force vector applied to a point on the sensor when it contacts the environment, and is the force vector which the sensor is intended to measure. $\delta_x$, $\delta_y$ and $\delta_z$ are linear displacements of this contact point relative to the base of the sensor, while $\theta_x$, $\theta_y$ and $\theta_z$ are relative angular displacements. These displacments occur when the force vector is applied at the contact point and is counterbalanced by forces and moments which support the base of the sensor, the latter being held by the controllable element or arm. In FIG. 4, the contact point is a distance "a" from the base, as shown. The four bars of length "b" shown in this figure will deform elastically and counterbalance the applied force vector. Following the principles of structural analysis (see for example Crandall and Dahl, editors, "Introduction to the Mechanics of Solids", McGraw Hill, 1959, Chapter 8) one may calculate the entries in matrix $K_S$, assuming that each bar of length "b" has an area moment I and a Young's modulus E, with these results:

$$K_{xx} = \frac{6\,EI}{b^3}$$

$$K_{yy} = \frac{12\,EI}{b^3}$$

$$K_{zz} = K_{xx}$$

$$K_{\theta x} = \frac{12\,(a^2 + b^2)\,EI}{b^3}$$

$$K_{\theta y} = \frac{12\,EI}{b}$$

$$K_{\theta z} = K_{\theta x}$$

The formulae for $K_{\theta x}$ and $K_{\theta z}$ are obtained on the assumption that b is substantially less than a, the usual case for the device shown in FIG. 4. When any such device is built, it is advisable to determine the entries of $K_S$ experimentally as well as theoretically, to determine their values and the degree to which the intended diagonality of $K_S$ has been achieved. To do this, one must physically apply known loads and movements and, by means of suitable guages, measure the resulting displacements.

APPENDIX II

```
PAGE   1      FSYSV3 SRC      FORCE STEERING CONTROL PROGRAM

1                                          .TITLE  FORCE STEERING CONTROL PROGRAM
  2                           / ACCUMULATOR SWITCH DESIGNATIONS:
  3                           /        0       INITIALIZATION
  4                           /        1       FORCE CALIBRATION
  5                           /        2       BIAS COMPUTATION
  6                           /        3       PRINT ANGLES
  7                           /        4       PRINT JACOBIAN
  8                           /        5       PRINT INVERSE JACOBIAN
  9                           /        6       FORCE BIAS COMP
 10                           /        7       TURN OFF FORCE STEERING LOOP
 11                           /        8       PASSIVE ARM
 12                           /        9       OUTPUT SCALING
 13                           /       10           "
 14                           /       11           "
 15                           /       12       DISPLAY SELECTION:  0=TP    1=F
 16                           /       13           "              2=FORCE  3=TOL
 17                           /       14           "                       4=TOP
 18                           /       15       DISPLAY CHANNEL NUMBER
 19                           /       16           "
 20                           /       17           "
 21                                          .GLOBL COMM,TTRAN,FAMAT
 22                           /       SYMBOLIC ASSIGNMENTS
 23            705032 A               INAX1=705032
 24            705052 A               INAX2=705052
 25            705072 A               INAX3=705072
 26            705212 A               INAX4=705212
 27            705232 A               INAX5=705232
 28            705252 A               INAX6=705252
 29            705272 A               INAX7=705272
 30            705024 A               OUTAX1=705024
 31            705044 A               OUTAX2=705044
 32            705064 A               OUTAX3=705064
 33            705204 A               OUTAX4=705204
 34            705224 A               OUTAX5=705224
 35            705244 A               OUTAX6=705244
 36            705264 A               OUTAX7=705264
 37            705004 A               OUTMOD=705004
 38            705002 A               UPDTAX=705002
 39            701301 A               ADSF=701301
 40            701312 A               ADRB=701312
 41            701103 A               ADSM=701103
 42            700002 A               IOF=700002
 43            700042 A               ION=700042
 44            700044 A               CLON=700044
 45            700004 A               CLOF=700004
 46            702105 A               RELBUF=702105
 47            757575 A               EOS=757575
 48                           /
 49                           /
 50                           /
 51                                          .TIMER  8,CLOOP
       00000 R 000000 A *G            CAL
       00001 R 000014 A *G            14
       00002 R 000015 R *G            +0*100000+CLOOP
                        *G            .DEC

PAGE   2      FSYSV3 SRC      FORCE STEERING CONTROL PROGRAM

00003 R 777770 A *G            =8
 52    00004 R 100425 R               JMS    GETTSK
 53    00005 R 750004 A      BGRND    LAS
 54    00006 R 502662 R               AND    (400000 /INITIALIZE SWITCH
 55    00007 R 740200 A               SZA
 56    00010 R 100310 R               JMS    POSIT
 57    00011 R 100131 R               JMS    READT    /BACKGROUND PROGRAMS
 58    00012 R 100160 R               JMS    FORMT
 59    00013 R 122660 E               JMS*   FAMAT
 60    00014 R 600005 R               JMP    BGRND
 61                           /
 62                           /
 63    00015 R 740000 A      CLOOP    NOP             /INTERRUPT PROGRAMS
 64    00016 R 042175 R               DAC    ACSAVE
 65    00017 R 641002 A               LACQ
 66    00020 R 042176 R               DAC    MQSAVE
 67    00021 R 750004 A               LAS
 68    00022 R 502663 R               AND    (002000 /TURN OFF FORCE LOOP
 69    00023 R 740200 A               SZA
 70    00024 R 600062 R               JMP    CLOOP3
 71    00025 R 100530 R               JMS    READF
 72    00026 R 100613 R               JMS    FORMF
 73    00027 R 750004 A               LAS
 74    00030 R 502664 R               AND    (200000 /FORCE CALIBRATION
 75    00031 R 740200 A               SZA
 76    00032 R 600060 R               JMP    CLOOP2
```

| PAGE | 2 | FSYSV3 SRC | FORCE STEERING CONTROL PROGRAM | | -continued |
|---|---|---|---|---|---|

```
 77    00033 R 100713 R           JMS    STMON
 78    00034 R 101014 R   CLOOP4  JMS    STEER
 79    00035 R 101157 R           JMS    ATXSPD
 80    00036 R 101612 R           JMS    FORMTO
 81    00037 R 101763 R           JMS    OUTTO
 82    00040 R 100072 R   CLOOP1  JMS    DATMON
 83    00041 R 202177 R           LAC    SCSAVE     /RESTORE ALL REGS
 84    00042 R 242665 R           XOR    (77
 85    00043 R 342666 R           TAD    (640402
 86    00044 R 502667 R           AND    (640477
 87    00045 R 040046 R           DAC    .+1
 88    00046 R 740040 A           XX
 89    00047 R 202176 R           LAC    MQSAVE
 90    00050 R 652000 A           LMQ
 91    00051 R 777770 A           LAW    -10
 92    00052 R 062670 R           DAC*   (7
 93    00053 R 200015 R           LAC    CLOOP
 94    00054 R 740010 A           RAL
 95    00055 R 202175 R           LAC    ACSAVE
 96    00056 R 700044 A           CLON
 97    00057 R 620015 R           JMP*   CLOOP
 98    00060 R 100435 R   CLOOP2  JMS    STPRAT
 99    00061 R 600040 R           JMP    CLOOP1
100    00062 R 777772 A   CLOOP3  LAW    -6
101    00063 R 042146 R           DAC    X1I
102    00064 R 202671 R           LAC    (FORCE
103    00065 R 042147 R           DAC    X2I
104    00066 R 162147 R           DZM*   X2I
105    00067 R 442146 R           ISZ    X1I
```

| PAGE | 3 | FSYSV3 SRC | FORCE STEERING CONTROL PROGRAM |
|---|---|---|---|

```
106    00070 R 600066 R           JMP    .-2
107    00071 R 600034 R           JMP    CLOOP4
108                        /
109                        /
110                        /
111                        /
112                        //.............BACKGROUND PROGRAMS.............
113                        /
114                        /
115                        /
116                        /
117    00072 R 740000 A   DATMON  NOP               /DATA DISPLAY ROUTINE
118    00073 R 750004 A           LAS
119    00074 R 502672 R           AND    (70
120    00075 R 542673 R           SAD    (0
121    00076 R 600110 R           JMP    RA00
122    00077 R 542674 R           SAD    (10
123    00100 R 600112 R           JMP    RA01
124    00101 R 542675 R           SAD    (20
125    00102 R 600114 R           JMP    RA02
126    00103 R 542676 R           SAD    (30
127    00104 R 600116 R           JMP    RA03
128    00105 R 542677 R           SAD    (40
129    00106 R 600120 R           JMP    RA04
130    00107 R 620072 R           JMP*   DATMON
131    00110 R 202700 R   RA00    LAC    (TP-1
132    00111 R 600121 R           JMP    RA
133    00112 R 202701 R   RA01    LAC    (F
134    00113 R 600121 R           JMP    RA
135    00114 R 202702 R   RA02    LAC    (FORCE-1
136    00115 R 600121 R           JMP    RA
137    00116 R 202703 R   RA03    LAC    (TOL-1
138    00117 R 600121 R           JMP    RA
139    00120 R 202704 R   RA04    LAC    (TOP-1
140    00121 R 042132 R   RA      DAC    TMP
141    00122 R 750004 A           LAS
142    00123 R 502670 R           AND    (7
143    00124 R 342132 R           TAD    TMP
144    00125 R 042132 R           DAC    TMP
145    00126 R 222132 R           LAC*   TMP
146    00127 R 702105 A           RELBUF
147    00130 R 620072 R           JMP*   DATMON
148                        /
149                        /
150                        /
151                        /
152    00131 R 740000 A   READT   NOP               /READ RESOLVER ANGLES
153    00132 R 705032 A           INAX1
154    00133 R 342114 R           TAD    AX1B       /ADD BIAS
155    00134 R 042043 R           DAC    1P
156    00135 R 705052 A           INAX2
157    00136 R 342115 R           TAD    AX2B
158    00137 R 042044 R           DAC    TP+1
159    00140 R 705072 A           INAX3
160    00141 R 342116 R           TAD    AX3B
```

PAGE 4    FSYSV3 SRC    FORCE STEERING CONTROL PROGRAM

```
161     00142 R  042045 R              DAC    TP+2
162     00143 R  705212 A              INAX4
163     00144 R  342117 R              TAD    AX4B
164     00145 R  042046 R              DAC    TP+3
165     00146 R  705232 A              INAX5
166     00147 R  342120 R              TAD    AX5B
167     00150 R  042047 R              DAC    TP+4
168     00151 R  705252 A              INAX6
169     00152 R  342121 R              TAD    AX6B
170     00153 R  042050 R              DAC    TP+5
171     00154 R  705272 A              INAX7
172     00155 R  342122 R              TAD    AX7B
173     00156 R  042051 R              DAC    TP+6
174     00157 R  620131 R              JMP*   READT
175                              /
176                              /
177                              /
178                              /
179     00160 R  740000 A      FORMT   NOP
180     00161 R  202705 R              LAC    (TP        /INITIALIZE REGS
181     00162 R  042142 R              DAC    X1
182     00163 R  202706 R              LAC    (REST
183     00164 R  042143 R              DAC    X2
184     00165 R  202707 R              LAC    (TPO
185     00166 R  042144 R              DAC    X3
186     00167 R  202710 R              LAC    (RFLG
187     00170 R  042145 R              DAC    X4
188     00171 R  777772 A              LAW    -6
189     00172 R  042155 R              DAC    COUNT
190     00173 R  222142 R      LOOP3   LAC*   X1
191     00174 R  502150 R              AND    B0         /CHECK BIT 0 OF DATA
192     00175 R  042152 R              DAC    NOWB0      /WORD
193     00176 R  222144 R              LAC*   X3
194     00177 R  502150 R              AND    B0
195     00200 R  542152 R              SAD    NOWB0
196     00201 R  600230 R              JMP    SAMREG     /SAME ZONE
197     00202 R  222145 R              LAC*   X4         /BIT ZERO CHANGED
198     00203 R  741100 A              SPA
199     00204 R  600227 R              JMP    REG3
200     00205 R  740200 A              SZA
201     00206 R  600225 R              JMP    REG2
202     00207 R  222142 R      REG1    LAC*   X1
203     00210 R  740010 A              RAL
204     00211 R  502150 R              AND    B0
205     00212 R  542152 R              SAD    NOWB0
206     00213 R  600230 R              JMP    SAMREG     /SAME ZONE
207     00214 R  222142 R              LAC*   X1
208     00215 R  502151 R              AND    B1
209     00216 R  740200 A              SZA
210     00217 R  600222 R              JMP    R13        /CHANGE TO ZONE 3
211     00220 R  462145 R              ISZ*   X4         /CHANGE TO ZONE 2
212     00221 R  600230 R              JMP    SAMREG
213     00222 R  750001 A      R13     CLC
214     00223 R  062145 R              DAC*   X4
215     00224 R  600230 R              JMP    SAMREG
```

PAGE 5    FSYSV3 SRC  ,  FORCE STEERING CONTROL PROGRAM

```
216     00225 R  162145 R      REG2    DZM*   X4         /CHANGE TO ZONE 1
217     00226 R  600230 R              JMP    SAMREG
218     00227 R  162145 R      REG3    DZM*   X4         /CHANGE TO ZONE 1
219     00230 R  222142 R      SAMREG  LAC*   X1
220     00231 R  062144 R              DAC*   X3         /UPDATE TPO
221     00232 R  222145 R              LAC*   X4
222     00233 R  741100 A              SPA
223     00234 R  600244 R              JMP    FOR3
224     00235 R  741200 A              SNA
225     00236 R  600254 R              JMP    FOR1
226     00237 R  222142 R      FOR2    LAC*   X1         /FORMAT DATA FOR ZONE 2
227     00240 R  744020 A              RCR
228     00241 R  162143 R              DZM*   X2
229     00242 R  442143 R              ISZ    X2
230     00243 R  600275 R              JMP    FLOAT
231     00244 R  222142 R      FOR3    LAC*   X1         /FORMAT DATA FOR ZONE 3
232     00245 R  740001 A              CMA
233     00246 R  342711 R              TAD    (1
234     00247 R  744020 A              RCR
235     00250 R  242150 R              XOR    B0
236     00251 R  162143 R              DZM*   X2
237     00252 R  442143 R              ISZ    X2
238     00253 R  600275 R              JMP    FLOAT
239     00254 R  222142 R      FOR1    LAC*   X1         /FORMAT DATA FOR ZONE 1
240     00255 R  744000 A              CLL
241     00256 R  660501 A              LRSS   1
242     00257 R  740100 A              SMA
243     00260 R  600262 R              JMP    NORMAL
```

PAGE 5     FSYSV3 SRC ,  FORCE STEERING CONTROL PROGRAM     -continued

```
244    00261 R 740001 A              CMA
245    00262 R 650000 A      NORMAL  CLQ
246    00263 R 744000 A              CLL
247    00264 R 640444 A              NORM
248    00265 R 042153 R              DAC    TMPT
249    00266 R 641001 A              LACS
250    00267 R 342712 R              TAD    (-35
251    00270 R 740001 A              CMA
252    00271 R 062143 R              DAC*   X2
253    00272 R 442143 R              ISZ    X2
254    00273 R 202153 R              LAC    TMPT
255    00274 R 242152 R              XOR    NOW80
256    00275 R 062143 R      FLOAT   DAC*   X2     /FLOATING POINT FORMAT
257    00276 R 442143 R              ISZ    X2
258    00277 R 442142 R              ISZ    X1
259    00300 R 442144 R              ISZ    X3
260    00301 R 442145 R              ISZ    X4
261    00302 R 442133 R              ISZ    COUNT
262    00303 R 600173 R              JMP    LOOP3
263    00304 R 122661 E              JMS*   TTRAN
264    00305 R 600307 R              JMP    .+2
265    00306 R 002174 R              .DSA   BREST
266    00307 R 620163 R              JMP*   FORMT
267                                  /
268                                  /
269                                  /
270                                  /
```

PAGE 6     FSYSV3 SRC ,  FORCE STEERING CONTROL PROGRAM

```
271                                  //..............INITIALIZATION ROUTINES........
272                                  /
273                                  /
274                                  /
275                                  /
276    00310 R 740000 A      POSIT   NOP
277    00311 R 703004 A              CLOF
278    00312 R 750004 A              LAS
279    00313 R 502713 R              AND    (100000
280    00314 R 741200 A              SNA
281    00315 R 600343 R              JMP    OTAX
282    00316 R 202714 R              LAC    (INAX1
283    00317 R 042140 R              DAC    INAX
284    00320 R 202715 R              LAC    (AX1B
285    00321 R 042136 R              DAC    AXB
286    00322 R 777772 A              LAW    -6
287    00323 R 042135 R              DAC    COUNT
288    00324 R 402140 R      POS1    XCT    INAX    /COMPUTE RESOLVER BIASES
289    00325 R 740001 A              CMA
290    00326 R 342711 R              TAD    (1
291    00327 R 062136 R              DAC*   AXB
292    00330 R 442136 R              ISZ    AXB
293    00331 R 202140 R              LAC    INAX
294    00332 R 342675 R              TAD    (20
295    00333 R 042132 R              DAC    TMP
296    00334 R 502716 R              AND    (100
297    00335 R 740200 A              SZA
298    00336 R 100420 R              JMS    POS4
299    00337 R 202132 R              LAC    TMP
300    00340 R 042140 R              DAC    INAX
301    00341 R 442135 R              ISZ    COUNT
302    00342 R 600324 R              JMP    POS1
303    00343 R 750000 A      OTAX    CLA            /INITIALIZE RESOLVERS
304    00344 R 705004 A              OUTMOD
305    00345 R 202715 R              LAC    (AX1B
306    00346 R 042136 R              DAC    AXB
307    00347 R 202717 R              LAC    (IC1
308    00350 R 042141 R              DAC    IC
309    00351 R 202720 R              LAC    (OUTAX1
310    00352 R 042137 R              DAC    OUTAX
311    00353 R 777772 A              LAW    -6     /INITIALIZE POSITION
312    00354 R 042135 R              DAC    COUNT  /FLAGS
313    00355 R 222136 R      POS2    LAC*   AXB
314    00356 R 740001 A              CMA
315    00357 R 362141 R              TAD*   IC
316    00360 R 402137 R              XCT    OUTAX
317    00361 R 442141 R              ISZ    IC
318    00362 R 442136 R              ISZ    AXB
319    00363 R 202137 R              LAC    OUTAX
320    00364 R 342675 R              TAD    (20
321    00365 R 042132 R              DAC    TMP
322    00366 R 502716 R              AND    (100
323    00367 R 740200 A              SZA
324    00370 R 100420 R              JMS    POS4
325    00371 R 202132 R              LAC    TMP
```

PAGE 7    FSYSV3 SRC    FORCE STEERING CONTROL PROGRAM

```
326    00372 R 042137 R              DAC     OUTAX
327    00373 R 442135 R              ISZ     COUNT
328    00374 R 600355 R              JMP     POS2
329    00375 R 705002 A              UPDTAX
330    00376 R 777772 A              LAW     -6
331    00377 R 042135 R              DAC     COUNT
332    00400 R 202710 R              LAC     (RFLG
333    00401 R 042142 R              DAC     X1
334    00402 R 202707 R              LAC     (TP0
335    00403 R 042143 R              DAC     X2
336    00404 R 162142 R    POS3      DZM*    X1
337    00405 R 162143 R              DZM*    X2
338    00406 R 442142 R              ISZ     X1
339    00407 R 442143 R              ISZ     X2
340    00410 R 442135 R              ISZ     COUNT
341    00411 R 600404 R              JMP     POS3
342    00412 R 770000 A              LAW     -10000
343    00413 R 042135 R              DAC     COUNT
344    00414 R 442135 R    WAIT      ISZ     COUNT
345    00415 R 600414 R              JMP     WAIT
346    00416 R 700044 A              CLON
347    00417 R 620510 R              JMP*    POSIT
348    00420 R 740000 A    POS4      NOP
349    00421 R 202132 R              LAC     TMP
350    00422 R 342716 R              TAD     (100
351    00423 R 042132 R              DAC     TMP
352    00424 R 620420 R              JMP*    POS4
353                                  /
354                                  /
355                                  /
356                                  /
357    00425 R 740000 A    GETTSK    NOP
358    00426 R 700004 A              CLOF
359    00427 R 100455 R              JMS     STPRAT
360    00430 R 202721 R              LAC     (STEP1
361    00431 R 042227 R              DAC     STADR
362    00432 R 100451 R              JMS     STCTRL
363    00433 R 700044 A              CLON
364    00434 R 620425 R              JMP*    GETTSK
365                                  /
366                                  /
367                                  /
368                                  /
369    00435 R 740000 A    STPRAT    NOP
370    00436 R 202722 R              LAC     (770000
371    00437 R 705204 A              OUTMOD
372    00440 R 750000 A              CLA
373    00441 R 705024 A              OUTAX1
374    00442 R 705044 A              OUTAX2
375    00443 R 705064 A              OUTAX3
376    00444 R 705204 A              OUTAX4
377    00445 R 705224 A              OUTAX5
378    00446 R 705244 A              OUTAX6
379    00447 R 705002 A              UPDTAX
380    00450 R 620435 R              JMP*    STPRAT
```

PAGE 8    FSYSV3 SRC    FORCE STEERING CONTROL PROGRAM

```
381                                  /
382                                  /
383                                  /
384                                  /
385    00451 R 740000 A    STCTRL    NOP
386    00452 R 202227 R              LAC     STADR
387    00453 R 342670 R              TAD     (7
388    00454 R 042240 R              DAC     SCCNT
389    00455 R 222240 R              LAC*    SCCNT
390    00456 R 042237 R              DAC     ST0      /ZERO LIMIT OPTION
391    00457 R 740200 A              SZA
392    00460 R 042230 R              DAC     LIMADR   /SET UP LIMADR
393    00461 R 777772 A              LAW     -6
394    00462 R 042240 R              DAC     SCCNT
395    00463 R 202227 R              LAC     STADR    /SET UP OSPD
396    00464 R 342711 R              TAD     (1
397    00465 R 042146 R              DAC     X1I
398    00466 R 202723 R              LAC     (OSPD
399    00467 R 042147 R              DAC     X2I
400    00470 R 222146 R    SC01      LAC*    X1I
401    00471 R 442146 R              ISZ     X1I
402    00472 R 062147 R              DAC*    X2I
403    00473 R 442147 R              ISZ     X2I
404    00474 R 442240 R              ISZ     SCCNT
405    00475 R 600470 R              JMP     SC01
406    00476 R 202657 E              LAC     COMM     /DEFINE RR CTRL PNT
407    00477 R 342724 R              TAD     (154
408    00500 R 042240 R              DAC     SCCNT
```

| | | | | | |
|---|---|---|---|---|---|
PAGE 8 FSYSV3 SRC   FORCE STEERING CONTROL PROGRAM   -continued

```
409      00501 R 202227 R            LAC    STADR
410      00502 R 342674 R            TAD    (10
411      00503 R 042241 R            DAC    SCCNT1   /TRANSFER ONE F.P. WORD
412      00504 R 222241 R            LAC*   SCCNT1   /FROM CPTAB TO EXT
413      00505 R 042241 R            DAC    SCCNT1
414      00506 R 222241 R            LAC*   SCCNT1
415      00507 R 062240 R            DAC*   SCCNT
416      00510 R 442240 R            ISZ    SCCNT
417      00511 R 442241 R            ISZ    SCCNT1
418      00512 R 222241 R            LAC*   SCCNT1
419      00513 R 062240 R            DAC*   SCCNT
420      00514 R 222227 R            LAC*   STADR
421      00515 R 502722 R            AND    (770000
422      00516 R 740200 A            SZA
423      00517 R 042325 R            DAC    FORMSK
424      00520 R 222227 R            LAC*   STADR
425      00521 R 640606 A            LLS    6
426      00522 R 502722 R            AND    (770000
427      00523 R 740200 A            SZA
428      00524 R 042326 R            DAC    TOLMSK
429                              ///SET UP FORCE MATRIX HERE
430      00525 R 620451 R            JMP*   STCTRL
431                          /
432                          /
433                          /
434                          /
435      00526 R 740000 A    ERROR   NOP
```

PAGE 9 FSYSV3 SRC   FORCE STEERING CONTROL PROGRAM

```
436      00527 R 740040 A            HLT
437                          /
438                          /
439                          /
440                          /
441                          //.................CONTROL LOOP ROUTINES........
442                          /
443                          /
444                          /
445                          /
446      00530 R 740000 A    READF   NOP
447      00531 R 700002 A            IOF
448      00532 R 202674 R            LAC    (7
449      00533 R 701103 A            ADSM
450      00534 R 701301 A            ADSF
451      00535 R 600534 R            JMP    .-1
452      00536 R 750000 A            CLA
453      00537 R 701312 A            ADRB
454      00540 R 042251 R            DAC    GAIN     /READ LOOP GAIN
455      00541 R 202701 R            LAC    (F
456      00542 R 040577 R            DAC    RF01
457      00543 R 202725 R            LAC    (FB
458      00544 R 042236 R            DAC    FBPNT
459      00545 R 777770 A            LAW    -10
460      00546 R 040600 R            DAC    RFCNT
461      00547 R 202674 R            LAC    (10
462      00550 R 040576 R            DAC    FCHAN
463      00551 R 200576 R    RF02    LAC    FCHAN
464      00552 R 440576 R            ISZ    FCHAN
465      00553 R 701103 A            ADSM
466      00554 R 701301 A            ADSF
467      00555 R 600554 R            JMP    .-1
468      00556 R 750064 A            LAS
469      00557 R 502726 R            AND    (004000
470      00560 R 740200 A            SZA
471      00561 R 600601 R            JMP    FBIAS
472      00562 R 750000 A            CLA
473      00563 R 701312 A            ADRB
474      00564 R 740000 A            NOP             /TMP REPLACES JMS ADDFB
475      00565 R 502323 R            AND    FCHOP
476      00566 R 660502 A            LRSS   2         /SCALING
477      00567 R 060577 R            DAC*   RF01
478      00570 R 440577 R    RF03    ISZ    RF01
479      00571 R 442236 R            ISZ    FBPNT
480      00572 R 440600 R            ISZ    RFCNT
481      00573 R 600551 R            JMP    RF02
482      00574 R 700042 A            ION
483      00575 R 620530 R            JMP*   READF
484      00576 R 000000 A    FCHAN   0
485      00577 R 000000 A    RF01    0
486      00600 R 000000 A    RFCNT   0
487      00601 R 750000 A    FBIAS   CLA
488      00602 R 701312 A            ADRB
489      00603 R 740001 A            CMA
490      00604 R 342711 R            TAD    (1
```

PAGE 10   FSYSV3 SRC    FORCE STEERING CONTROL PROGRAM

```
491     00605 R 062236 R            DAC*    FBPNT
492     00606 R 160577 R            DZM*    RF01
493     00607 R 600573 R            JMP     RF03
494     00610 R 740000 A    ADDFB   NOP
495     00611 R 362236 R            TAD*    FBPNT
496     00612 R 620610 R            JMP*    ADDFB
497                              /
498                              /
499                              /
500                              /
501     00613 R 740000 A    FORMF   NOP
502     00614 R 202253 R            LAC     F+1
503     00615 R 740001 A            CMA
504     00616 R 342255 R            TAD     F+3
505     00617 R 101145 R            JMS     FORFIL
506     00620 R 042274 R            DAC     FORCE+2 /FZ
507     00621 R 202256 R            LAC     F+4
508     00622 R 740001 A            CMA
509     00623 R 342254 R            TAD     F+2
510     00624 R 101145 R            JMS     FORFIL
511     00625 R 042272 R            DAC     FORCE   /FX
512     00626 R 202256 R            LAC     F+4
513     00627 R 342257 R            TAD     F+5
514     00630 R 342260 R            TAD     F+6
515     00631 R 342261 R            TAD     F+7
516     00632 R 101145 R            JMS     FORFIL
517     00633 R 042273 R            DAC     FORCE+1 /FY
518     00634 R 202254 R            LAC     F+2
519     00635 R 342252 R            TAD     F
520     00636 R 740001 A            CMA
521     00637 R 342253 R            TAD     F+1
522     00640 R 342255 R            TAD     F+3
523     00641 R 102014 R            JMS     M304
524     00642 R 101145 R            JMS     FORFIL
525     00643 R 042276 R            DAC     FORCE+4 /MY
526     00644 R 202261 R            LAC     F+7
527     00645 R 740001 A            CMA
528     00646 R 342257 R            TAD     F+5
529     00647 R 102014 R            JMS     M304
530     00650 R 042246 R            DAC     FFTMP
531     00651 R 202256 R            LAC     F+4
532     00652 R 740001 A            CMA
533     00653 R 342254 R            TAD     F+2
534     00654 R 650000 A            CLQ
535     00655 R 640601 A            LLS     1
536     00656 R 342246 R            TAD     FFTMP
537     00657 R 101145 R            JMS     FORFIL
538     00660 R 042277 R            DAC     FORCE+5 /MZ
539     00661 R 202252 R            LAC     F
540     00662 R 740001 A            CMA
541     00663 R 342260 R            TAD     F+6
542     00664 R 102014 R            JMS     M304
543     00665 R 042246 R            DAC     FFTMP
544     00666 R 202255 R            LAC     F+3
545     00667 R 740001 A            CMA
```

PAGE 11   FSYSV3 SRC    FORCE STEERING CONTROL PROGRAM

```
546     00670 R 342253 R            TAD     F+1
547     00671 R 650000 A            CLQ
548     00672 R 640601 A            LLS     1
549     00673 R 342246 R            TAD     FFTMP
550     00674 R 101145 R            JMS     FORFIL
551     00675 R 042275 R            DAC     FORCE+3 /MX
552                              /
553     00676 R 777772 A            LAW     -6
554     00677 R 042134 R            DAC     COUNTI
555     00700 R 202671 R            LAC     (FORCE
556     00701 R 042147 R            DAC     X2I
557     00702 R 202325 R            LAC     FORMSK
558     00703 R 744000 A            CLL
559     00704 R 740010 A    MLP     RAL
560     00705 R 740400 A            SNL
561     00706 R 162147 R            DZM*    X2I
562     00707 R 442147 R            ISZ     X2I
563     00710 R 442134 R            ISZ     COUNTI
564     00711 R 600704 R            JMP     MLP
565     00712 R 620613 R            JMP*    FORMF
566                              /
567                              /
568                              /
569                              /
570     00713 R 740000 A    STMON   NOP
571     00714 R 750004 A            LAS
572     00715 R 502727 R            AND     (001000 /CHECK PASSIVE MODE
```

PAGE 11    FSYSV3 SRC    FORCE STEERING CONTROL PROGRAM   -continued

```
573    00716 R 242330 R            XOR    PASFLG   /SWITCH
574    00717 R 741200 A            SNA
575    00720 R 600736 R            JMP    STM01
576    00721 R 750004 A            LAS
577    00722 R 502727 R            AND    (001000
578    00723 R 740200 A            SZA
579    00724 R 600732 R            JMP    STM02
580    00725 R 142330 R            DZM    PASFLG
581    00726 R 202327 R            LAC    START
582    00727 R 042227 R            DAC    STADR
583    00730 R 100451 R            JMS    STCTRL
584    00731 R 600736 R            JMP    STM01
585    00732 R 042330 R   STM02    DAC    PASFLG
586    00733 R 202730 R            LAC    (STEPPA
587    00734 R 042227 R            DAC    STADR
588    00735 R 100451 R            JMS    STCTRL
589    00736 R 202227 R   STM01    LAC    STADR
590    00737 R 342731 R            TAD    (11
591    00740 R 042242 R            DAC    SMPNT    /ADR 1ST TERMCND ENTRY
592    00741 R 222242 R   SM06     LAC*   SMPNT
593    00742 R 740200 A            SZA
594    00743 R 601007 R            JMP    SM01     /ANGLE TERMCOND
595    00744 R 442242 R            ISZ    SMPNT
596    00745 R 222242 R            LAC*   SMPNT
597    00746 R 042245 R            DAC    NSADR    /NEXT STEP ADDRESS
598    00747 R 777772 A            LAW    -6
599    00750 R 042243 R            DAC    SMCNT
600    00751 R 202671 R            LAC    (FORCE
```

PAGE 12    FSYSV3 SRC    FORCE STEERING CONTROL PROGRAM

```
601    00752 R 042244 R            DAC    SMPNT1
602    00753 R 442242 R   SM03     ISZ    SMPNT
603    00754 R 222244 R            LAC*   SMPNT1   /CHECK FOR FCRIT
604    00755 R 740100 A            SMA
605    00756 R 740001 A            CMA
606    00757 R 342711 R            TAD    (1
607    00760 R 342322 R            TAD    FCRIT
608    00761 R 741100 A            SPA
609    00762 R 740000 A            NOP             /TEMP FCRIT ROUTINE
610    00763 R 222242 R            LAC*   SMPNT
611    00764 R 741200 A            SNA
612    00765 R 600777 R            JMP    SM05     /LIMIT ZERO-SKP TO NEXT
613    00766 R 740100 A            SMA
614    00767 R 600774 R            JMP    SM02     /LIMIT IS NEGATIVE
615    00770 R 362244 R            TAD*   SMPNT1
616    00771 R 740100 A            SMA
617    00772 R 601010 R            JMP    SM04     /POS LIMIT EXCEEDED
618    00773 R 600777 R            JMP    SM05     /GO TO NEXT LINE
619    00774 R 362244 R   SM02     TAD*   SMPNT1
620    00775 R 741100 A            SPA
621    00776 R 601010 R            JMP    SM04     /NEG LIMIT EXCEEDED
622    00777 R 442244 R   SM05     ISZ    SMPNT1
623    01000 R 442243 R            ISZ    SMCNT
624    01001 R 600753 R            JMP    SM03
625    01002 R 442242 R            ISZ    SMPNT
626    01003 R 222242 R            LAC*   SMPNT
627    01004 R 542752 R            SAD    (EOS      /ANOTHER COND TO CHECK?
628    01005 R 620715 R            JMP*   STMON
629    01006 R 600741 R            JMP    SM06
630    01007 R 740040 A   SM01     HLT              /HLT ON ANGLE TERMCOND
631    01010 R 202245 R   SM04     LAC    NSADR
632    01011 R 042227 R            DAC    STADR
633    01012 R 100451 R            JMS    STCTRL
634    01013 R 620715 R            JMP*   STMON
635                                 /
636                                 /
637                                 /
638                                 /
730                                 /
731                                 /
732                                 /
733                                 /
734    01143 R 740000 A   FORFIL   NOP              /FILTER NOISE IN FORCE
735    01144 R 744000 A            CLL              /DATA
736    01145 R 741100 A            SPA
737    01146 R 744002 A            STL
738    01147 R 741100 A            SPA
739    01150 R 740001 A            CMA
740    01151 R 502324 R            AND    FORCMP
741    01152 R 740400 A            SNL
742    01153 R 621143 R            JMP*   FORFIL
743    01154 R 740001 A            CMA
744    01155 R 342711 R            TAD    (1
745    01156 R 621143 R            JMP*   FORFIL
```

PAGE 12    FSYSV3 SRC    FORCE STEERING CONTROL PROGRAM

```
746                              /
747                              /
748                              /
749                              /
750    01157 R 740000 A   ATXSPD  NOP
751    01160 R 202657 E           LAC    COMM
752    01161 R 342736 R           TAD    (44
753    01162 R 042216 R           DAC    AT
754    01163 R 202657 E           LAC    COMM
755    01164 R 342733 R           TAD    (14
756    01165 R 042217 R           DAC    SPD
757    01166 R 202657 E           LAC    COMM
758    01167 R 342676 R           TAD    (30
759    01170 R 042220 R           DAC    TD
760    01171 R 202737 R           LAC    (STRN
761    01172 R 042222 R           DAC    NPNT
762    01173 R 202217 R           LAC    SPD
763    01174 R 342740 R           TAD    (-2
764    01175 R 042221 R           DAC    SPDPNT
765    01176 R 101254 R           JMS    RN       /SCALE TRANS COMMANDS
```

PAGE 15    FSYSV3 SRC    FORCE STEERING CONTROL PROGRAM

```
766    01177 R 101254 R           JMS    RN
767    01200 R 101254 R           JMS    RN
768    01201 R 202741 R           LAC    (SROT
769    01202 R 042222 R           DAC    NPNT
770    01203 R 101254 R           JMS    RN       /SCALE ROT COMMANDS
771    01204 R 101254 R           JMS    RN
772    01205 R 101254 R           JMS    RN
773    01206 R 777772 A           LAW    -6
774    01207 R 041216 R           DAC    M
775    01210 R 142214 R   OLOOP   DZM    TEMP     /MULTIPLY COMMAND VECTOR
776    01211 R 142215 R           DZM    TEMP+1   /BY MATRIX
777    01212 R 777772 A           LAW    -6
778    01213 R 041215 R           DAC    N
779    01214 R 101565 R   ILOOP   JMS    SSM6X6
780    01215 R 000000 A   N       0
781    01216 R 000000 A   M       0
782    01217 R 342216 R           TAD    AT
783    01220 R 101540 R           JMS    FAL
784    01221 R 201215 R           LAC    N
785    01222 R 101605 R           JMS    SSV6
786    01223 R 342217 R           TAD    SPD
787    01224 R 101444 R           JMS    MULT
788    01225 R 202200 R           LAC    FA1
789    01226 R 042203 R           DAC    HA1
790    01227 R 202201 R           LAC    FA2
791    01230 R 042204 R           DAC    HA2
792    01231 R 202742 R           LAC    (TEMP
793    01232 R 101540 R           JMS    FAL
794    01233 R 101266 R           JMS    ADD
795    01234 R 202742 R           LAC    (TEMP
796    01235 R 101554 R           JMS    FAS
797    01236 R 441215 R           ISZ    N
798    01237 R 601214 R           JMP    ILOOP
799    01240 R 201216 R           LAC    M
800    01241 R 101605 R           JMS    SSV6
801    01242 R 342223 R           TAD    TD
802    01243 R 042205 R           DAC    ADR
803    01244 R 202214 R           LAC    TEMP
804    01245 R 062205 R           DAC*   ADR
805    01246 R 442205 R           ISZ    ADR
806    01247 R 202215 R           LAC    TEMP+1
807    01250 R 062205 R           DAC*   ADR
808    01251 R 441216 R           ISZ    M
809    01252 R 601210 R           JMP    OLOOP
810    01253 R 621157 R           JMP*   ATXSPD
811                              /
812                              /
813    01254 R 740000 A   RN      NOP
814    01255 R 202221 R           LAC    SPDPNT
815    01256 R 342743 R           TAD    (2
816    01257 R 042221 R           DAC    SPDPNT
817    01260 R 101540 R           JMS    FAL
818    01261 R 202222 R           LAC    NPNT
819    01262 R 101444 R           JMS    MULT
820    01263 R 202221 R           LAC    SPDPNT
```

PAGE 16    FSYSV3 SRC    FORCE STEERING CONTROL PROGRAM

```
821    01264 R 101554 R           JMS    FAS
822    01265 R 621254 R           JMP*   RN
823                              /
824                              /
825    01266 R 740000 A   ADD     NOP             /FLOATING POINT ADD
```

PAGE 16   FSYSV3 SRC    FORCE STEERING CONTROL PROGRAM   -continued

```
826      01267 R 101425 R              JMS    SIG      /ROUTINE
827      01270 R 202204 R              LAC    HA2
828      01271 R 741200 A              SNA
829      01272 R 601377 R              JMP    AD01
830      01273 R 202201 R              LAC    FA2
831      01274 R 741200 A              SNA
832      01275 R 601357 R              JMP    AD08
833      01276 R 202200 R      AD07    LAC    FA1
834      01277 R 740001 A              CMA
835      01300 R 342205 R              TAD    HA1
836      01301 R 740100 A              SMA
837      01302 R 601352 R              JMP    AD05
838      01303 R 042207 R              DAC    DELTA
839      01304 R 342744 R              TAD    (32
840      01305 R 751100 A              SPA|CLA
841      01306 R 601345 R              JMP    AD010
842      01307 R 202207 R              LAC    DELTA
843      01310 R 740001 A              CMA
844      01311 R 342711 R              TAD    (1
845      01312 R 242745 R              XOR    (640500
846      01313 R 041317 R              DAC    ADOP
847      01314 R 650000 A              CLQ
848      01315 R 202204 R              LAC    HA2
849      01316 R 744000 A              CLL
850      01317 R 740040 A      ADOP    XX
851      01320 R 042204 R              DAC    HA2
852      01321 R 202211 R              LAC    SIGN
853      01322 R 740100 A              SMA
854      01323 R 601330 R              JMP    AD02
855      01324 R 202204 R              LAC    HA2
856      01325 R 740001 A              CMA
857      01326 R 342711 R              TAD    (1
858      01327 R 042204 R              DAC    HA2
859      01330 R 202201 R      AD02    LAC    FA2
860      01331 R 744020 A              RCR
861      01332 R 342204 R              TAD    HA2
862      01333 R 042201 R              DAC    FA2
863      01334 R 740100 A              SMA
864      01335 R 601345 R              JMP    AD03
865      01336 R 202201 R              LAC    FA2
866      01337 R 740001 A              CMA
867      01340 R 342711 R              TAD    (1
868      01341 R 042201 R              DAC    FA2
869      01342 R 202662 R              LAC    (400000
870      01343 R 442200 R      AD03    ISZ    FA1
871      01344 R 740000 A              NOP
872      01345 R 242213 R      AD010   XOR    SIG5
873      01346 R 502662 R              AND    (400000
874      01347 R 042211 R              DAC    SIGN
875      01350 R 101403 R              JMS    NOR
```

PAGE 17   FSYSV3 SRC    FORCE STEERING CONTROL PROGRAM

```
876      01351 R 601377 R              JMP    AD01
877      01352 R 101361 R      AD05    JMS    AD06
878      01353 R 202211 R              LAC    SIGN
879      01354 R 242213 R              XOR    SIG5
880      01355 R 042213 R              DAC    SIG5
881      01356 R 601276 R              JMP    AD07
882      01357 R 101361 R      AD08    JMS    AD06
883      01360 R 601377 R              JMP    AD01
884      01361 R 740000 A      AD06    NOP
885      01362 R 202201 R              LAC    FA2
886      01363 R 042206 R              DAC    TMPA
887      01364 R 202204 R              LAC    HA2
888      01365 R 042201 R              DAC    FA2
889      01366 R 202206 R              LAC    TMPA
890      01367 R 042204 R              DAC    HA2
891      01370 R 202200 R              LAC    FA1
892      01371 R 042206 R              DAC    TMPA
893      01372 R 202205 R              LAC    HA1
894      01373 R 042200 R              DAC    FA1
895      01374 R 202206 R              LAC    TMPA
896      01375 R 042205 R              DAC    HA1
897      01376 R 621361 R              JMP*   AD06
898      01377 R 202201 R      AD01    LAC    FA2
899      01400 R 242211 R              XOR    SIGN
900      01401 R 042201 R              DAC    FA2
901      01402 R 621266 R              JMP*   ADD
902      01403 R 740000 A      NOR     NOP             /NORMALIZE ROUTINE
903      01404 R 202201 R              LAC    FA2
904      01405 R 744200 A              SZA|CLL
905      01406 R 601412 R              JMP    NOR1
906      01407 R 142200 R              DZM    FA1
907      01410 R 142211 R              DZM    SIGN
908      01411 R 621403 R              JMP*   NOR
```

| PAGE | 17 | FSYSV3 SRC | | FORCE STEERING CONTROL PROGRAM | | -continued |
|---|---|---|---|---|---|---|

```
909         01412 R 650000 A    NOR1    CLQ
910         01413 R 202201 R            LAC     FA2
911         01414 R 744000 A            CLL
912         01415 R 640444 A            NORM
913         01416 R 042201 R            DAC     FA2
914         01417 R 641001 A            LACS
915         01420 R 342712 R            TAD     (-35
916         01421 R 740001 A            CMA
917         01422 R 342200 R            TAD     FA1
918         01423 R 042200 R            DAC     FA1
919         01424 R 621403 R            JMP*    NOR
920         01425 R 740000 A    SIG     NOP
921         01426 R 202201 R            LAC     FA2
922         01427 R 502662 R            AND     (400000
923         01430 R 042210 R            DAC     SIGS
924         01431 R 202201 R            LAC     FA2
925         01432 R 502746 R            AND     (377777
926         01433 R 042201 R            DAC     FA2
927         01434 R 202204 R            LAC     HA2
928         01435 R 242210 R            XOR     SIGS
929         01436 R 502662 R            AND     (400000
930         01437 R 042211 R            DAC     SIGN
```

PAGE 18    FSYSV3 SRC    FORCE STEERING CONTROL PROGRAM

```
931         01440 R 202204 R            LAC     HA2
932         01441 R 502746 R            AND     (377777
933         01442 R 042204 R            DAC     HA2
934         01443 R 621425 R            JMP*    SIG
935                                  /
936                                  /
937         01444 R 740000 A    MULT    NOP             /FLOATING POINT MULTIPLY
938         01445 R 042212 R            DAC     ARG     /ROUTINE
939         01446 R 741100 A            SPA
940         01447 R 222212 R            LAC*    ARG
941         01450 R 042212 R            DAC     ARG
942         01451 R 202200 R            LAC     FA1
943         01452 R 042203 R            DAC     HA1
944         01453 R 202201 R            LAC     FA2
945         01454 R 741200 A            SNA
946         01455 R 601524 R            JMP     MULT2
947         01456 R 042204 R            DAC     HA2
948         01457 R 222212 R            LAC*    ARG
949         01460 R 502747 R            AND     (777
950         01461 R 242750 R            XOR     (400
951         01462 R 342751 R            TAD     (777400
952         01463 R 042200 R            DAC     FA1
953         01464 R 442212 R            ISZ     ARG
954         01465 R 222212 R            LAC*    ARG
955         01466 R 741200 A            SNA
956         01467 R 601524 R            JMP     MULT2
957         01470 R 042201 R            DAC     FA2
958         01471 R 142202 R            DZM     FA3
959         01472 R 202200 R            LAC     FA1
960         01473 R 342203 R            TAD     HA1
961         01474 R 042200 R            DAC     FA1
962         01475 R 142211 R            DZM     SIGN
963         01476 R 202204 R            LAC     HA2
964         01477 R 741100 A            SPA
965         01500 R 101530 R            JMS     MULT4
966         01501 R 640701 A            ALS     1
967         01502 R 041511 R            DAC     MULT1
968         01503 R 202201 R            LAC     FA2
969         01504 R 741100 A            SPA
970         01505 R 101530 R            JMS     MULT4
971         01506 R 640701 A            ALS     1
972         01507 R 744000 A            CLL
973         01510 R 653122 A            MUL
974         01511 R 740000 A    MULT1   NOP
975         01512 R 640501 A            LRS     1
976         01513 R 042201 R            DAC     FA2
977         01514 R 101403 R            JMS     NOR
978         01515 R 202201 R            LAC     FA2
979         01516 R 242211 R            XOR     SIGN
980         01517 R 042201 R            DAC     FA2
981         01520 R 641002 A            LACQ
982         01521 R 502752 R            AND     (777000
983         01522 R 042202 R            DAC     FA3
984         01523 R 621444 R            JMP*    MULT
985         01524 R 142200 R    MULT2   DZM     FA1
```

PAGE 19    FSYSV3 SRC    FORCE STEERING CONTROL PROGRAM

```
986         01525 R 142201 R            DZM     FA2
987         01526 R 142202 R            DZM     FA3
988         01527 R 621444 R            JMP*    MULT
```

PAGE 19     FSYSV3 SRC     FORCE STEERING CONTROL PROGRAM

```
989      01530 R 740000 A   MULT4   NOP
990      01531 R 502746 R           AND    (377777
991      01532 R 042213 R           DAC    M3
992      01533 R 202211 R           LAC    SIGN
993      01534 R 242662 R           XOR    (400000
994      01535 R 042211 R           DAC    SIGN
995      01536 R 202213 R           LAC    M3
996      01537 R 621530 R           JMP*   MULT4
997                                 /
998                                 /
999      01540 R 740000 A   FAL     NOP                    /FLOATING ACC LOAD
1000     01541 R 042205 R           DAC    ADR
1001     01542 R 222205 R           LAC*   ADR
1002     01543 R 502747 R           AND    (777
1003     01544 R 242750 R           XOR    (400
1004     01545 R 342751 R           TAD    (777400
1005     01546 R 042200 R           DAC    FA1
1006     01547 R 442205 R           ISZ    ADR
1007     01550 R 222205 R           LAC*   ADR
1008     01551 R 042201 R           DAC    FA2
1009     01552 R 142202 R           DZM    FA3
1010     01553 R 621540 R           JMP*   FAL
1011     01554 R 740000 A   FAS     NOP                    /FLOATING ACC STORE
1012     01555 R 042205 R           DAC    ADR
1013     01556 R 202200 R           LAC    FA1
1014     01557 R 502747 R           AND    (777
1015     01560 R 062205 R           DAC*   ADR
1016     01561 R 442205 R           ISZ    ADR
1017     01562 R 202201 R           LAC    FA2
1018     01563 R 062205 R           DAC*   ADR
1019     01564 R 621554 R           JMP*   FAS
1020     01565 R 740000 A   SSM6X6  NOP                    /SUBSCRIPT ROUTINE
1021     01566 R 202670 R           LAC    (7             /6 X 6 MATRIX
1022     01567 R 361565 R           TAD*   SSM6X6
1023     01570 R 441565 R           ISZ    SSM6X6
1024     01571 R 342753 R           TAD    (-1
1025     01572 R 744000 A           CLL
1026     01573 R 653122 A           MUL
1027     01574 R 000006 A           6
1028     01575 R 641002 A           LACQ
1029     01576 R 342670 R           TAD    (7
1030     01577 R 361565 R           TAD*   SSM6X6
1031     01600 R 441565 R           ISZ    SSM6X6
1032     01601 R 342753 R           TAD    (-1
1033     01602 R 744000 A           CLL
1034     01603 R 640701 A           ALS    1
1035     01604 R 621565 R           JMP*   SSM6X6
1036     01605 R 740000 A   SSV6    NOP                    /SUBSCRIPT ROUTINE
1037     01606 R 342754 R           TAD    (6             /6 COMP VECTOR
1038     01607 R 744000 A           CLL
1039     01610 R 640701 A           ALS    1
1040     01611 R 621605 R           JMP*   SSV6
```

PAGE 20     FSYSV3 SRC     FORCE STEERING CONTROL PROGRAM

```
1041                                /
1042                                /
1043                                /
1044                                /
1045     01612 R 000003 A   FORMTD  0                      /FORMAT F.P. WORD TO
1046     01613 R 202657 E           LAC    COMM           /FIXED POINT RATE
1047     01614 R 342154 R           TAD    COMM30         /COMMAND
1048     01615 R 042146 R           DAC    X1I
1049     01616 R 202755 R           LAC    (TOL
1050     01617 R 042147 R           DAC    X2I
1051     01620 R 777772 R           LAW    -6
1052     01621 R 042134 R           DAC    COUNTI
1053     01622 R 222146 R   LOOPA   LAC*   X1I            /EXP PORTION
1054     01623 R 442146 R           ISZ    X1I
1055     01624 R 502747 R           AND    (777
1056     01625 R 242750 R           XOR    (400
1057     01626 R 342751 R           TAD    (777400
1058     01627 R 740100 A           SMA
1059     01630 R 601637 R           JMP    SHFTL
1060     01631 R 740001 A           CMA
1061     01632 R 342711 R           TAD    (1
1062     01633 R 502665 R           AND    (77
1063     01634 R 242756 R           XOR    (LRSS
1064     01635 R 042135 R           DAC    OPRI
1065     01636 R 601642 R           JMP    DATA
1066     01637 R 502665 R   SHFTL   AND    (77
1067     01640 R 242757 R           XOR    (LLSS
1068     01641 R 042135 R           DAC    OPRI
1069     01642 R 222146 R   DATA    LAC*   X1I            /MAGNITUDE PORTION
1070     01643 R 442146 R           ISZ    X1I
1071     01644 R 740100 A           SMA
```

PAGE 20    FSYSV3 SRC    FORCE STEERING CONTROL PROGRAM    -continued

```
1072    01645 R 601651 R              JMP    SHIFT
1073    01646 R 502746 R              AND    (377777
1074    01647 R 740001 A              CMA
1075    01650 R 342711 R              TAD    (1
1076    01651 R 744000 A    SHIFT     CLL
1077    01652 R 650000 A              CLQ
1078    01653 R 660503 A              LRSS   3        /SHIFT FOR RATE
1079    01654 R 402135 R              XCT    OPRI
1080    01655 R 062147 R              DAC*   X2I
1081    01656 R 750004 A              LAS
1082    01657 R 502760 R              AND    (700     /SCALING SWITCHES
1083    01660 R 744000 A              CLL
1084    01661 R 640506 A              LRS    6
1085    01662 R 242757 R              XOR    (LLSS
1086    01663 R 042135 R              DAC    OPRI
1087    01664 R 222147 R              LAC*   X2I
1088    01665 R 650000 A              CLQ
1089    01666 R 402135 R              XCT    OPRI
1090    01667 R 062147 R              DAC*   X2I
1091    01670 R 601706 R              JMP    INC
1092    01671 R 202115 R    ACCEL     LAC    ADP+7    /THIS OPT TEMP REMOVED
1093    01672 R 741100 A              SPA
1094    01673 R 740001 A              CMA
1095    01674 R 502755 R              AND    (776000
```

PAGE 21    FSYSV3 SRC    FORCE STEERING CONTROL PROGRAM

```
1096    01675 R 744000 A              CLL
1097    01676 R 640513 A              LRS    13
1098    01677 R 342711 R              TAD    (1
1099    01700 R 041705 R              DAC    .+3
1100    01701 R 222147 R              LAC*   X2I
1101    01702 R 657122 A              MULS
1102    01703 R 740040 A              XX
1103    01704 R 641002 A              LACQ
1104    01705 R 062147 R              DAC*   X2I
1105    01706 R 442147 R    INC       ISZ    X2I
1106    01707 R 442134 R              ISZ    COUNTI
1107    01710 R 601622 R              JMP    LOOPA
1108                                  /---------------------
1109    01711 R 777772 A              LAW    -6
1110    01712 R 042134 R              DAC    COUNTI
1111    01713 R 744000 A              CLL
1112    01714 R 202753 R              LAC    (TDL
1113    01715 R 042147 R              DAC    X2I
1114    01716 R 202326 R              LAC    TDLMSK   /MASK OUT UNDESIRED
1115    01717 R 740010 A    MLP1      RAL             /RATES
1116    01720 R 740400 A              SNL
1117    01721 R 162147 R              DZM*   X2I
1118    01722 R 442147 R              ISZ    X2I
1119    01723 R 442134 R              ISZ    COUNTI
1120    01724 R 601717 R              JMP    MLP1
1121                                  /LOGICAL TO PHYSICAL TRANSFORMATION
1122    01725 R 202076 R              LAC    TDL+1
1123    01726 R 102006 R              JMS    MUL6
1124    01727 R 042066 R              DAC    TDP
1125    01730 R 202077 R              LAC    TDL+2
1126    01731 R 342075 R              TAD    TDL
1127    01732 R 740001 A              CMA
1128    01733 R 342711 R              TAD    (1
1129    01734 R 102006 R              JMS    MUL6
1130    01735 R 042067 R              DAC    TDP+1
1131    01736 R 202075 R              LAC    TDL
1132    01737 R 102006 R              JMS    MUL6
1133    01740 R 744000 A              CLL
1134    01741 R 660501 A              LRSS   1
1135    01742 R 042070 R              DAC    TDP+2
1136    01743 R 202101 R              LAC    TDL+4
1137    01744 R 342102 R              TAD    TDL+5
1138    01745 R 740001 A              CMA
1139    01746 R 342711 R              TAD    (1
1140    01747 R 102023 R              JMS    M203
1141    01750 R 042071 R              DAC    TDP+3
1142    01751 R 202101 R              LAC    TDL+4
1143    01752 R 740001 A              CMA
1144    01753 R 342711 R              TAD    (1
1145    01754 R 342102 R              TAD    TDL+5
1146    01755 R 102023 R              JMS    M203
1147    01756 R 042072 R              DAC    TDP+4
1148    01757 R 202100 R              LAC    TDL+3
1149    01760 R 102053 R              JMS    M809
1150    01761 R 042073 R              DAC    TDP+5
```

PAGE 22      FSYSV3 SRC      FORCE STEERING CONTROL PROGRAM

```
1151                                    /-------------------
1152       01762 R 621612 R              JMP*    FORMTO
1153                                    /
1154                                    /
1155                                    /
1156                                    /
1157       01763 R 740000 A     OUTTD   NOP              /OUTPUT RATES TO D-S
1158       01764 R 202722 R             LAC     (770000
1159       01765 R 705004 A             OUTMOD
1160       01766 R 202066 R             LAC     TDP
1161       01767 R 705024 A             OUTAX1
1162       01770 R 202067 R             LAC     TDP+1
1163       01771 R 705044 A             OUTAX2
1164       01772 R 202070 R             LAC     TDP+2
1165       01773 R 705064 A             OUTAX3
1166       01774 R 202071 R             LAC     TDP+3
1167       01775 R 705264 A             OUTAX4
1168       01776 R 202072 R             LAC     TDP+4
1169       01777 R 705224 A             OUTAX5
1170       02000 R 202073 R             LAC     TDP+5
1171       02001 R 705244 A             OUTAX6
1172       02002 R 202074 R             LAC     TDP+6
1173       02003 R 705264 A             OUTAX7
1174       02004 R 705002 A             UPDTAX
1175       02005 R 621763 R             JMP*    OUTTD
1176                                    /
1177                                    /
1178                                    /
1179                                    /
1180       02006 R 740000 A     MUL6    NOP              /MULT BY 6
1181       02007 R 744000 A             CLL
1182       02010 R 657122 A             MULS
1183       02011 R 000006 A             6
1184       02012 R 641002 A             LACQ
1185       02013 R 622006 R             JMP*    MUL6
1186       02014 R 740000 A     M304    NOP              /MULT BY 3/4
1187       02015 R 660502 A             LRSS    2
1188       02016 R 744000 A             CLL
1189       02017 R 657122 A             MULS
1190       02020 R 000003 A             3
1191       02021 R 641002 A             LACQ
1192       02022 R 622014 R             JMP*    M304
1193       02023 R 740000 A     M203    NOP              /MULT BY 2/3
1194       02024 R 744000 A             CLL
1195       02025 R 640601 A             LLS     1
1196       02026 R 744000 A             CLL
1197       02027 R 657323 A             IDIVS
1198       02030 R 000003 A             3
1199       02031 R 641002 A             LACQ
1200       02032 R 622023 R             JMP*    M203
1201       02033 R 740000 A     M809    NOP              /MULT BY 8/9
1202       02034 R 744000 A             CLL
1203       02035 R 640603 A             LLS     3
1204       02036 R 744000 A             CLL
1205       02037 R 657323 A             IDIVS
```

PAGE 23      FSYSV3 SRC      FORCE STEERING CONTROL PROGRAM

```
1206       02040 R 000011 A             11
1207       02041 R 641002 A             LACQ
1208       02042 R 622033 R             JMP*    M809
1209                                    /
1210                                    /
1211                                    /
1212                                    /
1213                                    /STORAGE ALLOCATIONS
1214                                    /
1215                                    /
1216       02043 R          A     TP    .BLOCK  7
1217       02052 R          A     TPO   .BLOCK  6
1218       02060 R          A     HFLG  .BLOCK  6
1219       02066 R          A     TDP   .BLOCK  7
1220       02075 R          A     TDL   .BLOCK  7
1221       02104 R          A     AOP   .BLOCK  10
1222       02114 R 000000 A     AX1B   0
1223       02115 R 000000 A     AX2B   0
1224       02116 R 000000 A     AX3B   0
1225       02117 R 000000 A     AX4B   0
1226       02120 R 000000 A     AX5B   0
1227       02121 R 000000 A     AX6B   0
1228       02122 R 000000 A     AX7B   0
1229       02123 R 733000 A     IC1    733000
1230       02124 R 024400 A     IC2    024400
1231       02125 R 162000 A     IC3    162000
1232       02126 R 204000 A     IC4    204000
1233       02127 R 641000 A     IC5    641000
```

PAGE 23  FSYSV3 SRC  FORCE STEERING CONTROL PROGRAM

```
1234    02130 R 207000 A    IC6      207000
1235    02131 R 000100 A    IC7      000100
1236    02132 R 000000 A    TMP      0
1237    02133 R 000000 A    COUNT    0
1238    02134 R 000000 A    COUNT1   0
1239    02135 R 000000 A    OPRI     0
1240    02136 R 000000 A    AXB      0
1241    02137 R 000000 A    OUTAX    0
1242    02140 R 000000 A    INAX     0
1243    02141 R 000000 A    IC       0
1244    02142 R 000000 A    X1       0
1245    02143 R 000000 A    X2       0
1246    02144 R 000000 A    X3       0
1247    02145 R 000000 A    X4       0
1248    02146 R 000000 A    X1I      0
1249    02147 R 000000 A    X2I      0
1250    02150 R 400000 A    B0       400000
1251    02151 R 200000 A    B1       200000
1252    02152 R 000000 A    NOWB0    0
1253    02153 R 000000 A    TMPT     0
1254    02154 R 000050 A    COMM30   30
1255    02155 R        A    REST     .BLOCK  14
1256    02171 R 020014 A             .DSA    020014
1257    02172 R 000000 A             .DSA    0
1258    02173 R 000000 A             .DSA    0
1259    02174 R 002155 R    BREST    .DSA    REST
1260    02175 R 000000 A    ACSAVE   0
```

PAGE 24  FSYSV3 SRC  FORCE STEERING CONTROL PROGRAM

```
1261    02176 R 000000 A    MQSAVE   0
1262    02177 R 000000 A    SCSAVE   0
1263                        /
1264    02200 R 000000 A    FA1      0
1265    02201 R 000000 A    FA2      0
1266    02202 R 000000 A    FA3      0
1267    02203 R 000000 A    HA1      0
1268    02204 R 000000 A    HA2      0
1269    02205 R 000000 A    ADR      0
1270    02206 R 000000 A    TMPA     0
1271    02207 R 000000 A    DELTA    0
1272    02210 R 000000 A    SIGS     0
1273    02211 R 000000 A    SIGN     0
1274    02212 R 000000 A    ARG      0
1275    02213 R 000000 A    MS       0
1276    02214 R 000000 A    TEMP     0
1277    02215 R 000000 A             0
1278    02216 R 000000 A    AT       0
1279    02217 R 000000 A    SPD      0
1280    02220 R 000000 A    TD       0
1281    02221 R 000000 A    SPDPNT   0
1282    02222 R 000000 A    NPNT     0
1283    02223 R 000775 A    SHOT     000775
1284    02224 R 200000 A             200000
1285    02225 R 000000 A    STRN     000000
1286    02226 R 244000 A             244000
1287                        /
1288                        /
1289    02227 R 000000 A    STADR    0
1290    02230 R 000000 A    LIMADR   0
1291    02231 R 000000 A    STCT     0
1292    02232 R 000000 A    FPNT     0
1293    02233 R 000000 A    LPNT     0
1294    02234 R 000000 A    IPNT     0
1295    02235 R 000000 A    OPNT     0
1296    02236 R 000000 A    FBPNT    0
1297    02237 R 000000 A    ST0      0
1298    02240 R 000000 A    SCCNT    0
1299    02241 R 000000 A    SCCNT1   0
1300    02242 R 000000 A    SMPNT    0
1301    02243 R 000000 A    SMCNT    0
1302    02244 R 000000 A    SMPNT1   0
1303    02245 R 000000 A    NSADR    0
1304    02246 R 000000 A    FFTMP    0
1305    02247 R 000000 A    CTMP     0
1306    02250 R 000000 A    SBIT     0
1307    02251 R 000000 A    GAIN     0
1308    02252 R        A    F        .BLOCK  10
1309    02262 R        A    FB       .BLOCK  10
1310    02272 R        A    FORCE    .BLOCK  6
1311    02300 R        A    MODE     .BLOCK  6
1312    02306 R        A    ISPD     .BLOCK  6
1313    02314 R        A    OSPD     .BLOCK  6
1314    02322 R 377777 A    FCRIT    377777
1315    02323 R 777777 A    FCHOP    777777
```

```
PAGE  25      FSYSV3 SRC      FORCE STEERING CONTROL PROGRAM 1316       02324 R 740000 A     FORCHP  740000
1317       02325 R 770000 A     FORMSK  770000
1318       02326 R 770000 A     TOLMSK  770000
1319       02327 R 002331 R     START   STEP1
1320       02330 R 000000 A     PASFLG  0
1321                             /
1322                             /
1323                             /
1324             002331 R        STAB=STEP1
1325       02331 R 000001 A     STEP1   1                  /STEP NUMBER
1326       02332 R 000000 A             0                  /OSPD
1327       02333 R 000000 A             0
1328       02334 R 000000 A             0
1329       02335 R 000000 A             0
1330       02336 R 000000 A             0
1331       02337 R 000000 A             0
1332       02340 R 000000 A             0                  /LIMTAB PTR
1333       02341 R 002645 R             .DSA    CP1        /CPTAB PNTR
1334       02342 R 000000 A             0                  /TERMCOND CODE
1335       02343 R 002351 R             STEP1
1336       02344 R 000000 A             0                  /TERMCONDS
1337       02345 R 000000 A             0
1338       02346 R 000000 A             0
1339       02347 R 000000 A             0
1340       02350 R 000000 A             0
1341       02351 R 000000 A             0
1342       02352 R 757575 A             EOS
1343       02353 R        A     STEP2   .BLOCK  22
1344       02375 R        A     STEP3   .BLOCK  22
1345       02417 R        A     STEP4   .BLOCK  22
1346       02441 R        A     STEP5   .BLOCK  22
1347       02463 R        A     STEP6   .BLOCK  22
1348       02505 R        A     STEP7   .BLOCK  22
1349       02527 R 777700 A     STEPPA  777700
1350       02530 R        A             .BLOCK  6
1351       02536 R 000000 A             0
1352       02537 R 002645 R             CP1
1353       02540 R 000000 A             0
1354       02541 R 002527 R             STEPPA
1355       02542 R        A             .BLOCK  6
1356       02550 R 757575 A             757575
1363             002645 R        CPTAB=CP1
1364       02645 R 000003 A     CP1     3
1365       02646 R 351000 A             351000
1366       02647 R 000000 A     CP2     0
1367       02650 R 000000 A             0
1368       02651 R 000000 A     CP3     0
1369       02652 R 000000 A             0
1370       02653 R 000000 A     CP4     0

PAGE  26      FSYSV3 SRC      FORCE STEERING CONTROL PROGRAM 1371       02654 R 000000 A             0
1372       02655 R 000000 A     CP5     0
1373       02656 R 000000 A             0
1374             000000 A             .END
           02657 R 002657 E *E
           02660 R 002660 E *E
           02661 R 002661 E *E
           02662 R 400000 A *L
           02663 R 002000 A *L
           02664 R 200000 A *L
           02665 R 000077 A *L
           02666 R 640402 A *L
           02667 R 640417 A *L
           02670 R 000007 A *L
           02671 R 002272 R *L
           02672 R 000070 A *L
           02673 R 000000 A *L
           02674 R 000010 A *L
           02675 R 000020 A *L
           02676 R 000030 A *L
           02677 R 000040 A *L
           02700 R 002042 R *L
           02701 R 002252 R *L
           02702 R 002271 R *L
           02703 R 002074 R *L
           02704 R 002065 R *L
           02705 R 002245 R *L
           02706 R 002155 R *L
           02707 R 002052 R *L
           02710 R 002060 R *L
           02711 R 000001 A *L
           02712 R 777743 A *L
           02713 R 100000 A *L
```

PAGE 26    FSYSV3 SRC    FORCE STEERING CONTROL PROGRAM    -continued

```
            02714 R 105032 A *L
            02715 R 002114 R *L
            02716 R 000103 A *L
            02717 R 002123 R *L
            02720 R 105024 A *L
            02721 R 002331 R *L
            02722 R 710000 A *L
            02723 R 002314 R *L
            02724 R 003154 A *L
            02725 R 002262 R *L
            02726 R 004000 A *L
            02727 R 001000 A *L
            02730 R 002527 R *L
            02731 R 000011 A *L
            02732 R 757575 A *L
            02733 R 003014 A *L
            02734 R 002306 R *L
            02735 R 776000 A *L
            02736 R 000044 A *L
            02737 R 002225 R *L
            02740 R 777776 A *L
            02741 R 002225 R *L
```

PAGE 27    FSYSV3 SRC    FORCE STEERING CONTROL PROGRAM

```
            02742 R 002214 R *L
            02743 R 000002 A *L
            02744 R 000032 A *L
            02745 R 640500 A *L
            02746 R 377777 A *L
            02747 R 000777 A *L
            02750 R 000400 A *L
            02751 R 777400 A *L
            02752 R 777200 A *L
            02753 R 777777 A *L
            02754 R 000006 A *L
            02755 R 002075 R *L
            02756 R 660500 A *L
            02757 R 660600 A *L
            02760 R 000700 A *L
                SIZE=02773     NO ERROR LINES
```

```
C
C                        TTRAN
C       HARDWARE-TO-SOFTWARE ANGLE TRANSFORMATION MATRIX
C       CALLED WITH HARDWARE ANGLES IN PARAMETER R(6)
C       PUTS COMPUTED SOFTWARE ANGLES IN COMMON VARIABLE T(6)
C       ACC SWITCH 3 UP PRINTS OUT SOFTWARE ANGLES IN DEGREES
C
C
            SUBROUTINE TTRAN(R)
            DIMENSION R(6),G(6)
            COMMON/COMM/T(6),A(12),B(6,6),EXT
            T(1)=(R(3)/3.)*6.28318
            T(2)=(R(1)/6.)*6.28318
            T(3)=(-R(2)/6.-R(3)/3.)*6.28318
            T(4)=(R(6)*1.2)*6.28318
            T(5)=(-(R(4)+R(5))*.75-.125)*6.28318
            T(6)=((R(5)-R(4))*.75)*6.28318
            L=IACSW(3)
            IF (L.EQ.0) GO TO 300
            DO 301 LL=1,6
            G(LL)=T(LL)*57.29579
301         CONTINUE
            WRITE(3,100) G
100         FORMAT(6F12.6//////////)
300         CONTINUE
            RETURN
            END

C
C                        FAMAT
C       SUBROUTINE TO COMPUTE THE JACOBIAN MATRIX FOR THE E-2 ARM
C       CALLS MINV10 TO INVERT THE MATRIX
C       IF ARM AND HAND ARE WITHIN 5 DEG OF ALINGMENT THE MATRIX IS
C           COMPRESSED TO A 4 X 4 MATRIX BEFORE INVERSION
C       ACC SWITCH 4 UP PRINTS OUT JACOBIAN
C       ACC SWITCH 5 UP PRINTS OUT INVERTED MATRIX
C
C
            SUBROUTINE FAMAT
            DIMENSION AJ(6,6),AJS(4,4)
            COMMON/COMM/T(6),SPD(6),TD(6),AT(6,6),EXT
            IF=0
            S2=SIN(T(2))
            S3=SIN(T(3))
```

PAGE 27    FSYSV3 SRC    FORCE STEERING CONTROL PROGRAM    -continued

```
            S4=SIN(T(4))
            S5=SIN(T(5))
            S6=SIN(T(6))
            C2=COS(T(2))
            C3=COS(T(3))
            C4=COS(T(4))
            C5=COS(T(5))
            C6=COS(T(6))
            DO 11 I=1,6
11          AJ(I,6)=0.
            AJ(2,5)=0.
            AJ(3,5)=0.
            AJ(2,4)=0.
            AJ(3,6)=1.0
            AJ(1,5)=-EXT*S6
            AJ(3,5)=EXT*C6
            AJ(4,5)=C6
            AJ(6,5)=S6
            C56=C5*C6
            S6C5=S6*C5
            AJ(1,4)=-1.39*C6-EXT*C56
            AJ(3,4)=-1.39*S6-EXT*S6C5
            AJ(4,4)=-S6C5
            AJ(5,4)=S5
            AJ(6,4)=C56
            C46=C4*C6
            S4C6=S4*C6
            S456=S4*S5*S6
            AJ(1,3)=40.*(S4C6+S5*S6*C4)-1.39*S6C5*C4-EXT*(S4C6*S5+S6*C4)
            AJ(2,3)=1.39*S5*C4+40.*C4*C5
            AJ(3,3)=40.*(S4*S6-S5*C46)+1.39*C4*C56+EXT*(C46-S456)
            AJ(4,3)=-S456+C46
            AJ(5,3)=-S4*C5
            AJ(6,3)=S4C6*S5+S6*C4
            P6=S3*C6
            P7=S3*S5
            P8=S3*S6
            P9=S4C6
            P10=S4*S6
            P11=C6*S5
            P12=C56
            P14=S5*S6
            P18=S6*C5
            P19=C4*C3
            P24=C3*18.
            P25=C5*18.
            P27=18.*P19
            R12=-P18*40.-P25*P8-P24*P9-P14*(P27+1.39)
            R22=P7*18.-P19*P25+S5*40.-C5*1.39-EXT
            R32=P12*40.+P11*(P27+1.39)+P25*P6-P24*P10
            Y1=P19*P14+P8*C5+P9*C3
            Y2=-P7+P19*C5
            Y3=-P11*P19+P10*C3-P6*C5
            AJ(1,2)=R22*Y3-Y2*R32
            AJ(2,2)=R32*Y1-Y3*R12
            AJ(3,2)=R12*Y2-Y1*R22
            AJ(4,2)=Y1
            AJ(5,2)=Y2
            AJ(6,2)=Y3
            Q1=S2*S3
            Q18=S5*C2
            Q19=S6*C4
            Q25=C4*Q1
            Q26=C3*C5
            Q30=C5*C2
            Q33=C5*18.
            Q34=C5*40.
            Q45=18.*P19
            X1=P14*Q25-P10*Q18-Q26*S2*S6+P9*Q1+C6*C2*C4
            X2=-Q30*S4+S5*C3*S2+Q25*C5
            X3=P10*Q1-P11*Q25+Q19*C2+Q26*S2*C6+Q18*P9
            R11=-Q33*P8-C3*18.*P9-Q34*S6-P14*(Q45+1.39)
            R21=P7*18.-Q33*P19+S5*40.-C5*1.39-EXT
            R31=Q33*P6-P24*P10+Q34*C6+P11*(Q45+1.39)
            AJ(1,1)=R21*X3-X2*R31
            AJ(2,1)=R31*X1-X3*R11
            AJ(3,1)=R11*X2-X1*R21
            AJ(4,1)=X1
            AJ(5,1)=X2
            AJ(6,1)=X3
C AJ IS NOW THE JACOBIAN
            IF(T(5)+1.3) 300,299,299
300         DO 301 I=1,6
            DO 301 J=1,4
```

PAGE 27  FSYSV3 SRC   FORCE STEERING CONTROL PROGRAM   -continued

```
301     AJ(J,I)=AJ(J+1,I)
        DO 302 I=1,4
        AJS(I,1)=AJ(I,1)
        AJS(I,2)=AJ(I,3)
        AJS(I,3)=AJ(I,5)
302     AJS(I,4)=AJ(I,6)
        NAJ=IACSW(4)
        IF(NAJ.EQ.0) GO TO 305
        WRITE(3,102) ((AJS(I,J),J=1,4),I=1,4)
        WRITE(3,101)
305     CALL MINV10(AJS,4,IF)
        NI=IACSW(5)
        IF (NI.EQ.0) GO TO 306
        WRITE(3,102) ((AJS(I,J),J=1,4),I=1,4)
        WRITE(3,101)
306     DO 303 II=1,4
        DO 303 J=1,4
        I=5-II
303     AT(J,I+1)=AJS(J,I)
        DO 304 J=1,6
        AT(6,J)=AT(4,J)
        AT(5,J)=AT(3,J)
        AT(4,J)=0.
        AT(3,J)=AT(2,J)
        AT(2,J)=0.
        AT(J,1)=0.
304     AT(J,6)=0.
        AT(2,1)=-C6/40.*C5
        AT(3,1)=-S6*.025
        RETURN
299     NAJ=IACSW(4)
        IF (NAJ.EQ.0) GO TO 20
        WRITE(3,100) ((AJ(I,J),J=1,6),I=1,6)
        WRITE(3,101)
20      CALL MINV10(AJ,6,IF)
        NI=IACSW(5)
        IF (NI.EQ.0) GO TO 21
        WRITE(3,100) ((AJ(I,J),J=1,6),I=1,6)
        WRITE(3,101)
100     FORMAT(6F12.6)
101     FORMAT(///////////)
102     FORMAT(4F12.6)
21      DO 10 I=1,6
        DO 10 J=1,6
        AT(I,J)=AJ(I,J)
10      CONTINUE
        RETURN
        END
C
C                        MINV10
C  MATRIX INVERSION SUBROUTINE USING GAUSS-JORDAN METHOD
C  CALLING SEQUENCE:  CALL MINV10(A,N,IF)    WHERE
C       A IS MATRIX TO BE INVERTED
C       N IS DIMENSION OF MATRIX (UP TO 10)
C       IF RETURNS EQUAL TO 1 IF MATRIX IS SINGULAR
C       ON RETURN, A IS THE INVERTED MATRIX
C
C
        SUBROUTINE MINV10(A,N,IF)
        INTEGER P
        DIMENSION P(10),B(10),C(10,10),A(1,1)
C       LOOP THROUGH ROWS, CONSTRUCTING INVERSE
        DO 17 IP=1,N
        P(IP)=0.0
        B(IP)=0.0
        DO 16 JP=1,N
16      C(IP,JP)=0.0
17      CONTINUE
        DO 500 K=1,N
        BIGA=0.0
        DO 20 I=1,N
        DO 25 IP=1,N
C IF ROW USED BEFORE, SKIP IT
        IF (I-P(IP)) 25,20,25
25      CONTINUE
C IS THIS ELEMENT LARGER THAN THE CURRENT BIGA?
        IF (ABS(BIGA)-ABS(A(I,1))) 10,20,20
10      BIGA=A(I,1)
        IX=I
20      CONTINUE
        IF (BIGA) 30,35,30
```

PAGE 21  FSYSV3 SRC   FORCE STEERING CONTROL PROGRAM   -continued

```
35          IF=1
            RETURN
30          P(K)=IX
            B(IX)=1./BIGA
            DO 50 ID=1,N
50          A(IX,ID)=A(IX,ID)/BIGA
C OPERATE ON OTHER ROWS
            DO 60 IS=1,N
            IF(IS-IX) 59,60,59
59          FAC=A(IS,1)
            DO 65 JS=1,N
65          A(IS,JS)=A(IS,JS)-A(IX,JS)*FAC
            B(IS)=-B(IX)*FAC
60          CONTINUE
            DO 100 M=1,N
            NM1=N-1
            DO 99 NI=1,NM1
            A(M,NI)=A(M,NI+1)
99          CONTINUE
            A(M,N)=B(M)
100         CONTINUE
500         CONTINUE
C
C
C PERMUTE ROWS
            DO 600 I=1,N
            DO 599 J=1,N
            IPM=P(I)
            C(I,J)=A(IPM,J)
599         CONTINUE
600         CONTINUE
C PERMUTE COLUMNS
            DO 700 I=1,N
            DO 699 J=1,N
            JPM=P(J)
            A(I,JPM)=C(I,J)
699         CONTINUE
700         CONTINUE
            RETURN
            END
```

Having thus described our invention we claim:

1. Motion controlling apparatus comprising a first element controllable in at least two dimensions,
    a servo loop including said controllable element which directs motions of said controllable element in an environment, said servo loop comprising
    means for sensing interactions between said controllable element and said environment to provide sensory information, and
    task-related transfer function means for utilizing said sensory information to control the magnitude and direction of the velocity of said controllable element, whereby said controllable element produces motion, force and torque appropriate to the accomplishment of a predetermined task.

2. Motion controlling apparatus comprising a first element controllable in at least two dimentions,
    a first servo loop including said controllable element which directs motions of said controllable element in an environment,
    a second servo loop including, in addition to the said first servo loop
    means for sensing interactions between said controllable element and said environment to provide sensory information,
    an accommodation branch including task-related transfer function means for utilizing said sensory information to constrain the performance of said first servo loop to a desired task by controlling the magnitude and direction of the velocity of said controllable element, whereby said controllable element produces motion, force and torque appropriate to the accomplishment of a predetermined task.

3. Motion controlling apparatus comprising a first element controllable in at least two dimensions, said controllable element having at least two controllable degrees of freedom,
    said controllable degree of freedom being expressed in a first coordinate system,
    said controllable element having at least two output motions,
    said output motions being expressed in a second coordinate system,
    a servo loop including said controllable element,
    means for performing transformations between said first coordinate system and said second coordinate system,
    said servo loop directing motions of said controllable element in an enviornment,
    said servo loop comprising
    means for sensing interactions between said controllable element and said environment to provide sensory information, and
    task-related transfer function means for utilizing said sensory information to control the magnitude and direction of the velocity of said controllable element of said controllable element, whereby said controllable element produces motion, force and torque appropriate to the accomplishment of a predetermined task.

4. Motion controlling apparatus comprising a first element controllable in at least two dimensions,
said controllable element having at least two controllable degrees of freedom, said controllable degrees of freedom being expressed in a first coordinate system,
said controllable element having at least two output motions,
said output motions being expressed in a second coordinate system,
a first servo loop including said controllable element
means for performing transformations between said first coordinate system and said second coordinate system,
said first servo loop directing motions of said controllable element in an environment,
a second servo loop including, in addition to the said first servo loop
means for sensing interactions between said controllable element and said environment to provide sensory information,
an accommodation branch including task-related transfer function means for utilizing said sensory information to constrain the performance of said first servo loop to a desired task by controlling the magnitude and direction of the velocity of said controllable element,
whereby said controllable element produces motion, force and torque appropriate to the accomplishment of a predetermined task.

5. Apparatus according to claim 3 wherein said servo loop includes
resolved motion rate control transfer function apparatus
adapted to accomplish said transformation between said first coordinate system and said second coordinate system
to provide input commands to the said controllable element proportioned according to the relationship between input motions, forces and torques expressed in said first coordinate system, and desired output motions, forces and torques expressed in said second coordinate system,
whereby a command proportioned to desired output motions, forces and torques will be converted to commands which will cause said controllable element to perform said desired motions, forces and torques.

6. Apparatus according to claim 4 wherein said second servo loop includes
resolved motion rate control transfer function apparatus
adapted to accomplish said transformation between said first coordinate system and said second coordinate system to provide input commands to the said controllable element
proportioned according to the relationship between input motions, forces and torques expressed in said first coordinate system, and desired output motions, forces and torques expressed in said second coordinate system,
whereby a command proportioned to desired output motions, forces and torques will be converted to commands which will cause said controllable element to perform said desired motions, forces and torques.

7. Apparatus according to claim 1 wherein said servo loop includes
in series with said task-related transfer function apparatus,
additional transfer function and sensing apparatus adapted to convert sensed interactions between said controllable element and its enviroment into signals representative of said interactions.

8. Apparatus according to claim 2 wherein said second servo loop includes
in series with said task-related transfer function apparatus,
additional transfer function and sensing apparatus adapted to convert sensed interactions between said controllable element and its environment into signals representative of said interactions.

9. Apparatus according to claim 3 wherein said sensing apparatus is located on said controllable element and acts to sense interactions between said controllable element and said environment into signals representative of said interaction,
said signals being processed by transfer function apparatus in said servo loop
so as to express said signals in said second coordinate system.

10. Apparatus according to claim 4 wherein said sensing apparatus is located on said controllable element and acts to convert sensed interactions between said controllable element and said environment into signals representative of said interaction,
said signals being processed by transfer function apparatus in said second servo loop so as to express said signals in said second coordinate system.

11. Apparatus according to claim 3 wherein said sensing apparatus is located in said environment, and acts to sense interactions between said controllable element and said environment into signals representative of said interaction,
said signals being processed by transfer function apparatus in said servo loop so as to express said signals in said second coordinate system.

12. Apparatus according to claim 4 wherein said sensing apparatus is located in said environment, and
acts to convert sensed interactions between said controllable element and said environment into signals representative of said interaction,
said signals being processed by transfer function apparatus in said second servo loop so as to express said signals in said second coordinate system.

* * * * *